US012700943B2

(12) United States Patent
Billor et al.

(10) Patent No.: US 12,700,943 B2
(45) Date of Patent: Aug. 4, 2026

(54) ULTRA-SCALABLE HIGH-PERFORMANCE COMPUTING (HPC) NETWORK USING DENSE WAVELENGTH-DIVISION MULTIPLEXING (DWDM)

(71) Applicant: Microsoft Technology Licensing, LLC, Redmond, WA (US)

(72) Inventors: Denizcan Billor, Seattle, WA (US); Jamie Gaudette, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 300 days.

(21) Appl. No.: 18/460,892

(22) Filed: Sep. 5, 2023

(65) Prior Publication Data

US 2025/0080263 A1     Mar. 6, 2025

(51) Int. Cl.
H04J 14/02 (2006.01)

(52) U.S. Cl.
CPC ...... H04J 14/0212 (2013.01); H04J 14/0267 (2013.01); H04J 14/0307 (2023.08)

(58) Field of Classification Search
CPC .............. H04J 14/0212; H04J 14/0307; H04J 14/0267; H04J 14/02126; H04J 14/0217; H04J 14/02122; H04J 14/0209; H04Q 2011/0086; H04Q 11/0062; H04Q 2011/0064; H04Q 11/0005; H04Q 2011/0016; H04Q 2011/0024
See application file for complete search history.

(56) References Cited

U.S. PATENT DOCUMENTS

| | | | |
|---|---|---|---|
| 10,680,737 B1 * | 6/2020 | Al Sayeed .......... | H04J 14/0263 |
| 2012/0093458 A1 * | 4/2012 | Matsuura ............. | G02B 6/3512 |
| | | | 385/16 |

(Continued)

OTHER PUBLICATIONS

International Search Report and Written Opinion received for PCT Application No. PCT/US2024/041147, Dec. 10, 2024, 15 Pages.

(Continued)

*Primary Examiner* — Hibret A Woldekidan

(57) ABSTRACT

Systems and methods are provided for implementing an ultra-scalable high-performance computing ("HPC") network using dense wavelength-division multiplexing ("DWDM"). The HPC system includes an interconnection of GPU devices, multiplexer/demultiplexer ("mux/demux") devices, amplifiers, wavelength selective switches ("WSSs"), and optical circuit switches ("OCSs"). Each OCS includes a plurality of micro-electromechanical systems ("MEMS") mirrors and a plurality of input/output ("I/O") ports each communicatively coupled to one WSS mux/demux device one WSS. Each WSS mux/demux device is either communicatively coupled to one of the I/O ports of an OCS or one of a plurality of GPU mux/demux devices via an amplifier. Each GPU mux/demux device is communicatively coupled to a number of GPU devices, each including another number GPUs and one or more optoelectronic devices. Selectively controlling the MEMS mirrors of the OCSs and the WSS mux/demux devices of the WSSs allows connecting the GPUs in a network topology for computing a series of computations.

20 Claims, 16 Drawing Sheets

100

(56) References Cited

U.S. PATENT DOCUMENTS

| | | | |
|---|---|---|---|
| 2013/0209031 A1* | 8/2013 | Mclaughlin | G02B 6/3518 |
| | | | 359/558 |
| 2021/0152900 A1* | 5/2021 | Al Sayeed | H04J 14/0267 |
| 2024/0137143 A1* | 4/2024 | Asselin | H04J 14/0212 |
| 2025/0055810 A1* | 2/2025 | Shrikhande | H04L 49/111 |

OTHER PUBLICATIONS

Ishii, et al., "Toward exa-scale optical circuit switch interconnect networks for future datacenter/HPC", Proceedings of SPIE, vol. 10131, Jan. 28, 2017, pp. 1013105-1013105.

Wang, et al., "Integrating Nanosecond Optical Switching in Deep Distributed Learning System", Optical Fiber Communications Conference and Exhibition (OFC), Mar. 5, 2023, pp. 1-3.

International Preliminary Report on Patentability (Chapter I) received for PCT Application No. PCT/US2024/041147 mailed on Mar. 19, 2026, 10 pages.

* cited by examiner

I/O Device(s)
150

Computing System
145

GPU Server

GPU Device

GPU(s)
120a-120v
115a

Mux/ Demux
125a

Amp
130a

WSS
135a

OCS
140a

GPU Device

GPU(s)
120a-120v
115u

110a

Mux/ Demux
125b

Amp
130b

WSS
135b

OCS
140b

GPU Server

GPU Device

GPU(s)
120a
115a

Mux/ Demux
125c

Amp
130c

WSS
135c

OCS
140c

GPU Device

GPU(s)
120a-120n
115m

110t

Mux/ Demux
125w

Amp
130x

WSS
135y

OCS
140z

105

HPC System

200A

220a

Optic
*215a*

210

210

220b

GPU
*120a*
*205a*

GPU
*120b*
*205b*

Optic
*215b*

210

225a

225b

210

210

MUX/
DEMUX

210

GPU
*120d*
*205d*

GPU
*120c*
*205c*

Optic
*215c*

220c

225c

*205*

210

210

220d

Optic
*215d*

225d

*115*

*125*

GPU Device

200B

200C

200E

200G

200H

300A

300B

Point-to-Point Topology

300C

Linear Topology

300D

Bus Topology

300E

Ring Topology

300F

Star Topology

300G

Tree Topology

300H

Mesh Topology

300I

Fully Connected Topology

300J

Daisy Chain Topology

300K

Hybrid Topology

300L

Random Topology

300M

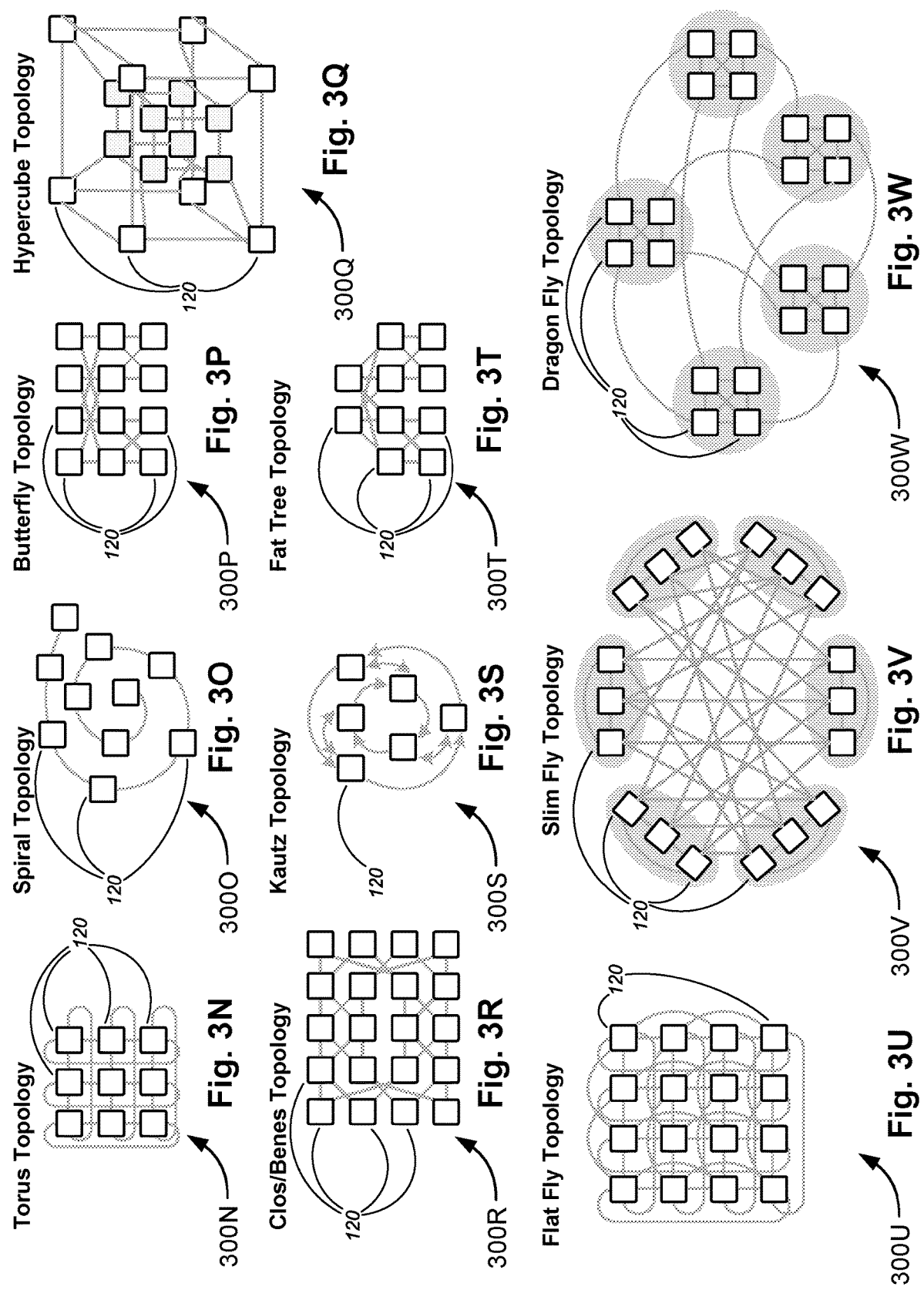
Torus Topology — Fig. 3N — 300N
Spiral Topology — Fig. 3O — 300O
Hypercube Topology — Fig. 3Q — 300Q
Butterfly Topology — Fig. 3P — 300P
Clos/Benes Topology — Fig. 3R — 300R
Kautz Topology — Fig. 3S — 300S
Fat Tree Topology — Fig. 3T — 300T
Dragon Fly Topology — Fig. 3W — 300W
Slim Fly Topology — Fig. 3V — 300V
Flat Fly Topology — Fig. 3U — 300U
120

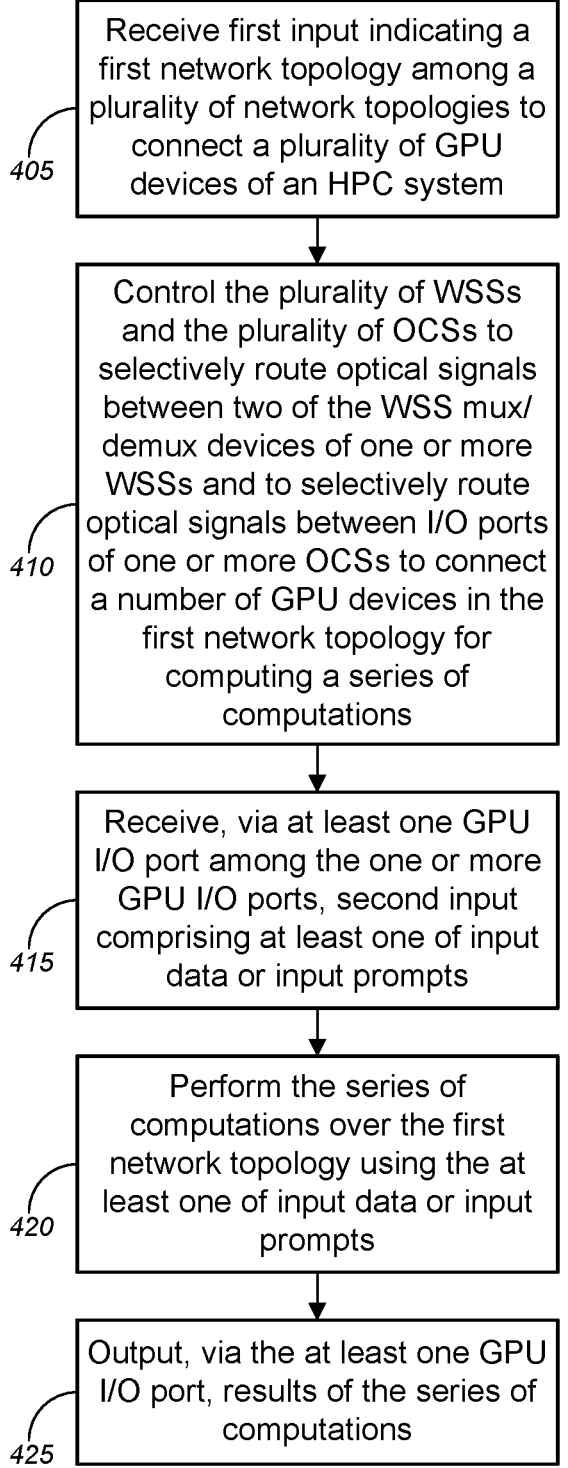

Receive first input indicating a first network topology among a plurality of network topologies to connect a plurality of GPU devices of an HPC system

405

Control the plurality of WSSs and the plurality of OCSs to selectively route optical signals between two of the WSS mux/demux devices of one or more WSSs and to selectively route optical signals between I/O ports of one or more OCSs to connect a number of GPU devices in the first network topology for computing a series of computations

410

Receive, via at least one GPU I/O port among the one or more GPU I/O ports, second input comprising at least one of input data or input prompts

415

Perform the series of computations over the first network topology using the at least one of input data or input prompts

420

Output, via the at least one GPU I/O port, results of the series of computations

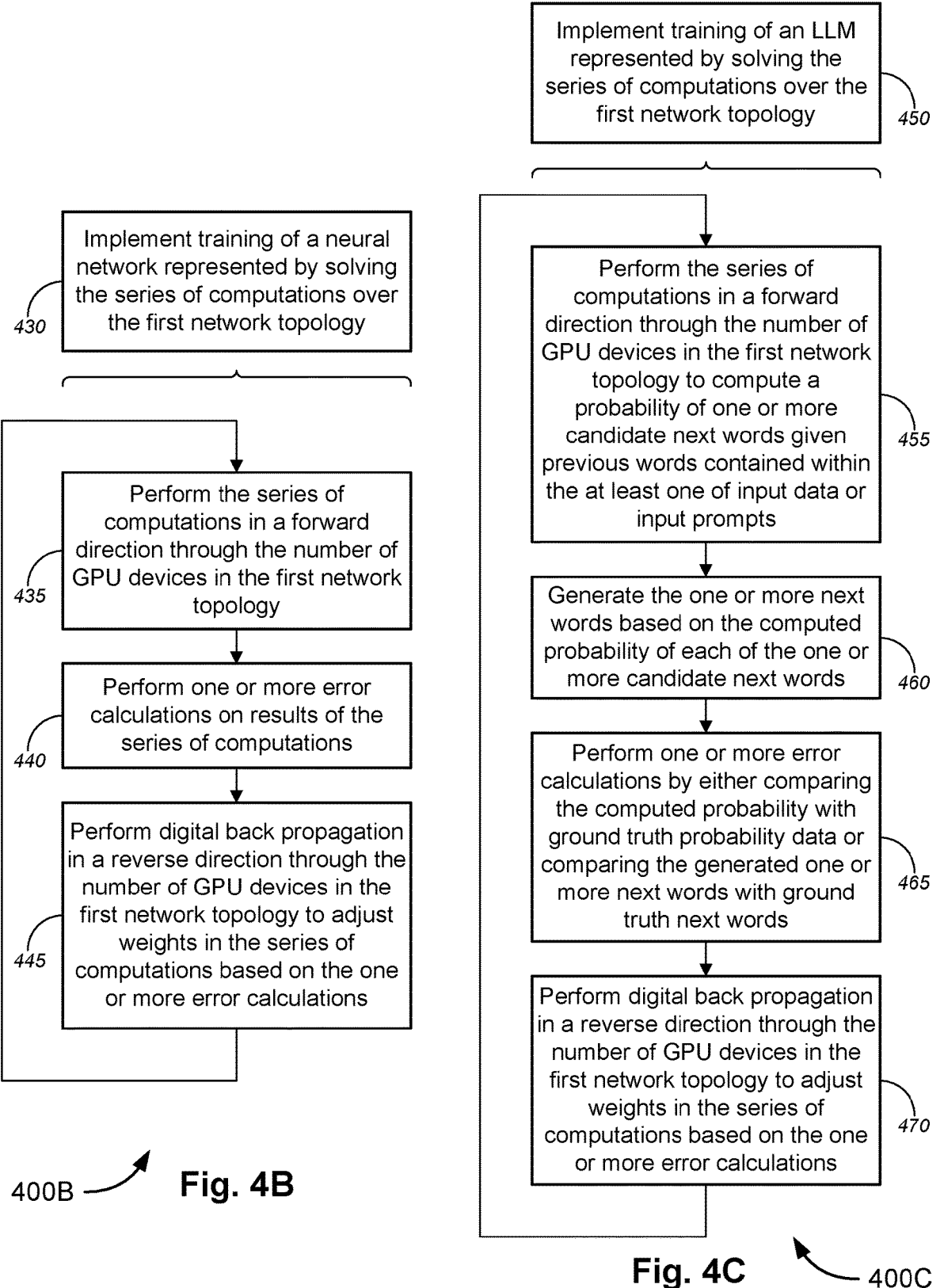

Implement training of an LLM represented by solving the series of computations over the first network topology

450

Perform the series of computations in a forward direction through the number of GPU devices in the first network topology to compute a probability of one or more candidate next words given previous words contained within the at least one of input data or input prompts

455

Generate the one or more next words based on the computed probability of each of the one or more candidate next words

460

Perform one or more error calculations by either comparing the computed probability with ground truth probability data or comparing the generated one or more next words with ground truth next words

465

Perform digital back propagation in a reverse direction through the number of GPU devices in the first network topology to adjust weights in the series of computations based on the one or more error calculations

470

Implement training of a neural network represented by solving the series of computations over the first network topology

430

Perform the series of computations in a forward direction through the number of GPU devices in the first network topology

435

Perform one or more error calculations on results of the series of computations

440

Perform digital back propagation in a reverse direction through the number of GPU devices in the first network topology to adjust weights in the series of computations based on the one or more error calculations

ULTRA-SCALABLE HIGH-PERFORMANCE COMPUTING (HPC) NETWORK USING DENSE WAVELENGTH-DIVISION MULTIPLEXING (DWDM)

BACKGROUND

As use of artificial intelligence ("AI") systems, such as large language models ("LLMs"), grows, training of corresponding AI networks becomes more and more complicated and hardware intensive. To configure graphics processing units ("GPUs") in such networks for training and inferencing requires large numbers of optical components, switches, and cables, resulting in significant costs in terms of both equipment and labor. It is with respect to this general technical environment to which aspects of the present disclosure are directed. In addition, although relatively specific problems have been discussed, it should be understood that the examples should not be limited to solving the specific problems identified in the background.

SUMMARY

This summary is provided to introduce a selection of concepts in a simplified form that are further described below in the detailed description section. This summary is not intended to identify key features or essential features of the claimed subject matter, nor is it intended as an aid in determining the scope of the claimed subject matter.

The currently disclosed technology, among other things, provides for an ultra-scalable high-performance computing ("HPC") network or system that is based on dense wavelength-division multiplexing ("DWDM"). The HPC network or system includes an interconnection of GPUs or GPU devices, multiplexer/demultiplexer ("mux/demux") devices, amplifiers, wavelength selective switches ("WSSs"), and optical circuit switches ("OCSs"). Each of a plurality of OCSs includes a plurality of micro-electromechanical systems ("MEMS") mirrors and a plurality of input/output ("I/O") ports each communicatively coupled to one WSS mux/demux device among a plurality of mux/demux devices of one WSS among the plurality of WSSs. Each of the WSS mux/demux devices is either communicatively coupled to one of the I/O ports of an OCS or one of a plurality of GPU mux/demux devices via an amplifier. Each GPU mux/demux device is communicatively coupled to a number of GPU devices, each including another number GPUs and one or more optoelectronic devices. Selectively controlling the MEMS mirrors of the OCSs and the WSS mux/demux devices of the WSSs allows for pathways through the HPC network to be formed to connect the GPUs or GPU devices in a network topology for computing a series of computations for AI system training and/or inferencing.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

A further understanding of the nature and advantages of particular embodiments may be realized by reference to the remaining portions of the specification and the drawings, which are incorporated in and constitute a part of this disclosure.

FIGS. 3C-3W depict various example network topologies that may be automatically and selectively configured using the ultra-scalable HPC network or system for implementing AI clusters based on DWDM.

FIGS. 4A-4C depict various example methods for implementing AI clusters using ultra-scalable HPC network or system based on DWDM.

DETAILED DESCRIPTION OF CERTAIN EMBODIMENTS

Figure 1:
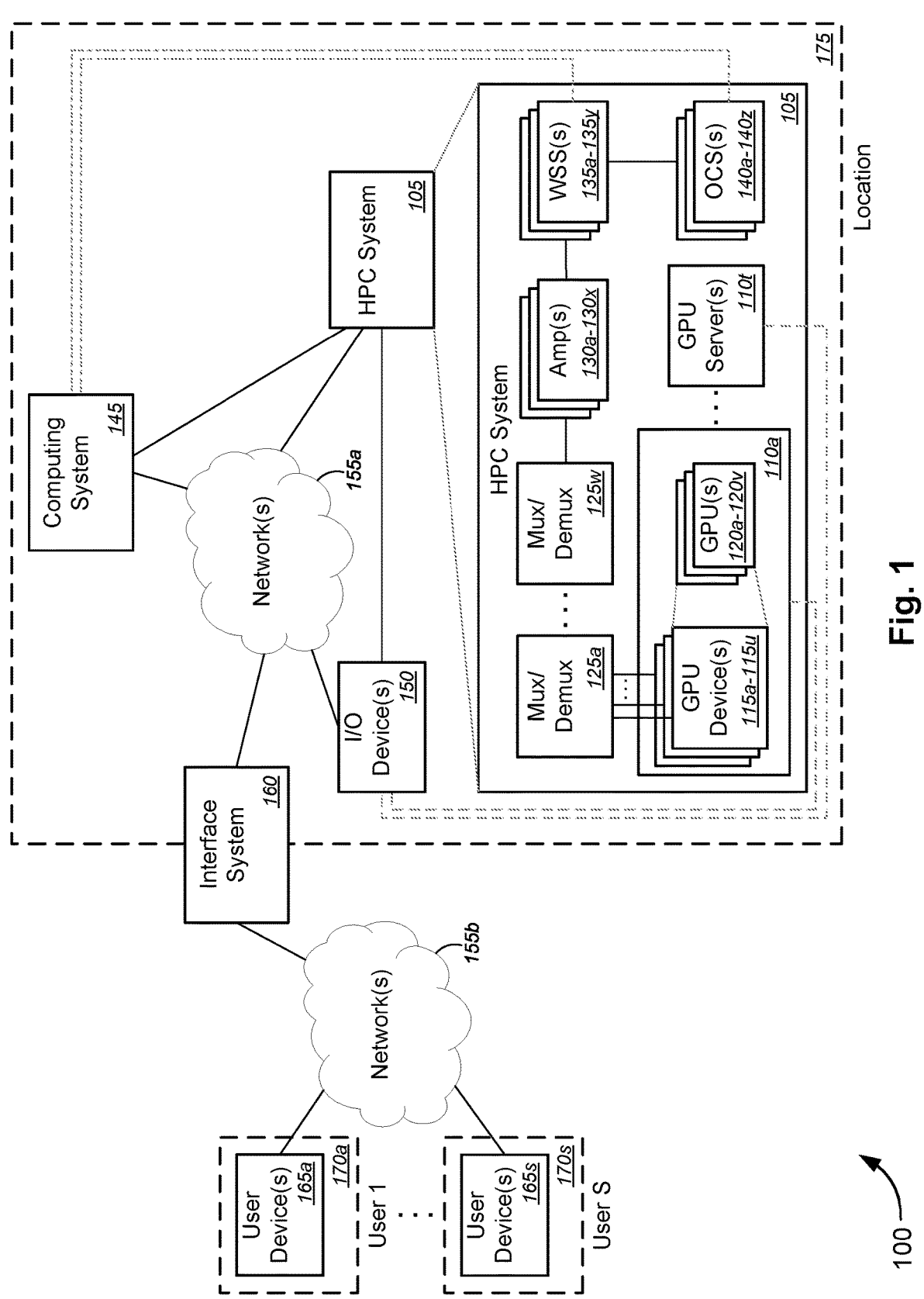
FIG. 1 depicts an example system for implementing AI clusters using ultra-scalable HPC network or system based on DWDM.

As briefly discussed above, assembling networks for training AI systems and/or for use of AI systems for inferencing requires significant numbers of components. For instance, an analogous electrical packet switch-based network of GPUs that is capable of over 100 Tbps bandwidth requires millions of optical components, tens of thousands of optical switches, and tens of millions of cables. Conventional OCS-based network of an equivalent number of GPUs that is capable of about 1000 Tbps bandwidth requires hundreds of thousands of optical components, thousands of optical switches, and millions of cables. Such large numbers of components and results in significant costs in in terms of equipment setup and maintenance, as well as labor.

Among other things, the technology discussed herein differs from conventional systems in that the configuration of components of the HPC system described herein provides for similar numbers of GPUs to be connected in a network with much smaller numbers of optical components, switches, and cables (e.g., tens of OCSs, over a hundred WSSs, and less than a half million cables), while providing over an order of magnitude greater bandwidth. The HPC system is also highly scalable while maintaining the relatively lower number of components, switches, and cables. Further, compared with electrical packet switches, the HPC system requires no mass or low mass optics. Moreover, WSSs and OCSs have much lower latency. The HPC network or system may be controlled to form GPUs or GPU devices into one or more network topologies among a plurality of network topologies, and to cause the GPUs or GPU devices to perform a series of computations (e.g., solving matrix mathematics equations) over the one or more network topologies. In some examples, the resultant one or more network topologies that are used to perform the series of computations (e.g., to solve the matrix mathematics equations) represents a neural network (or AI cluster) being trained or being used for inferencing.

Various modifications and additions can be made to the embodiments discussed without departing from the scope of the disclosed techniques. For example, while the embodiments described above refer to particular features, the scope of the disclosed techniques also includes embodiments having different combination of features and embodiments that do not include all of the above-described features.

We now turn to the embodiments as illustrated by the drawings. FIGS. 1-5 illustrate some of the features of a method, system, and apparatus for implementing AI clusters used for training and/or inferencing, and, more particularly, to methods, systems, and apparatuses for implementing AI clusters using ultra-scalable HPC network based on DWDM, as referred to above. The methods, systems, and apparatuses illustrated by FIGS. 1-5 refer to examples of different embodiments that include various components and steps, which can be considered alternatives or which can be used in conjunction with one another in the various embodiments. The description of the illustrated methods, systems, and apparatuses shown in FIGS. 1-5 is provided for purposes of illustration and should not be considered to limit the scope of the different embodiments.

FIG. 1 depicts an example system 100 for implementing AI clusters using ultra-scalable HPC network or system based on DWDM. System 100 includes an HPC system 105, which may include one or more GPU servers 110a-110t (collectively, "GPU servers 110"). At least one GPU server 110 may each include one or more GPU devices 115a-115u (collectively, "GPU devices 115"), and each GPU device 115 may include one or more GPUs 120a-120v (collectively, "GPUs 120"). HPC system 105 may further include a plurality of mux/demux devices 125a-125w (collectively, "mux/demux devices 125"), a plurality of amplifiers 130a-130x (collectively, "amplifiers 130"), a plurality of WSSs 135a-135y (collectively, "WSSs 135"), and a plurality of OCSs 140a-140z (collectively, "OCSs 140"). The plurality of mux/demux devices 125 may be communicatively coupled with the one or more GPU devices 115 and/or the one or more GPUs 120, while the plurality of amplifiers 130 may be communicatively coupled with the plurality of mux/demux devices 125. The plurality of WSSs 135 may be communicatively coupled with the plurality of mux/demux devices 125 (in some cases, via the plurality of amplifiers 130), and the plurality of OCSs 140 may be communicatively coupled with the plurality of WSSs 135. FIGS. 2A-2H, 3A, and 3B depict example configurations and arrangements by which these components of the HPC system 105 interconnect with each other.

System 100 may further include at least one of computing system 145, one or more I/O devices 150, network(s) 155, and/or interface system 160. Network(s) 155 may include network(s) 155a and 155b. In examples, system 100 may further include one or more user devices 165a-165s (collectively, "user devices 165") associated with corresponding users 1 through S 170a-170s (collectively, "users 170"). Herein, s or S, t, u, v, w, x, y, and z are non-negative integer numbers that may be either all the same as each other, all different from each other, or some combination of same and different (e.g., one set of two or more having the same values with the others having different values, a plurality of sets of two or more having the same value with the others having different values, etc.). In some examples, HPC system 105 and its components, along with computing system 145, I/O device(s) 150, network(s) 155a, and interface system 160 may be located within location 175, which may include a network data center or other service provider facility.

The HPC system 105 provides a GPU-based and DWDM-based computing platform that dynamically and automatically pools GPUs into particular network topologies (such as described and shown below with respect to FIGS. 3C-3W) that are used to compute complex mathematical equations (e.g., to solve complex matrix mathematics equations). The particular network topologies that are used to compute the complex mathematical equations (e.g., to solve the complex matrix mathematics equations) each or collectively represents a neural network (or AI cluster) being trained or being used for inferencing. The HPC system 105 is highly scalable, as more and more GPUs may be added and linked together dynamically by adding more and more WSSs 135 and OCSs 140, while still maintaining a relatively small number of WSSs 135 and OCSs 140 (on the order of scores or hundreds of these switching components, as compared with equivalent conventional computing platforms that may require tens of thousands or more similar optical switches or the like). With fewer numbers of switches required, fewer connecting components (e.g., cables, connectors, ports, and/or adapters) are required, thereby reducing costs. Meanwhile, the ultra-scalable nature of the HPC system 105 enables a greater number of GPUs to be pooled, thereby increasing computational power and reducing time to complete the computations.

Within each GPU device 115, two or more GPUs 120 may be communicatively coupled together to enable pooling or multiprocessing. Pooling or multiprocessing, as used herein, refers to a manner of combining multiple processors (in this case, GPUs) to increase computing power, where tasks are distributed to the pooled processors (in this case, the pooled GPUs) to perform the tasks in parallel. In some examples, some GPUs 120 may each be multithreaded to perform parallel or concurrent tasks. While both pooling and multithreading increase computing power by parallel processing, pooling uses multiple GPUs in parallel to perform concurrent tasks (usually a single task) while multithreading uses multiple computing threads within each GPU to perform concurrent tasks (usually different tasks). As described below with respect to FIGS. 2A-3B, GPUs 120 provide computational functionalities, while GPU devices 115 provide local pooling functionalities and GPU to optical interfacing with DWDM-based components of HPC system 105 (e.g., the mux/demux devices 125, the amplifiers 130, the WSSs 135, and the OCSs 140), and the GPU servers 110 each provide connectivity or pooling of GPU devices 115 and/or GPUs 120 therewithin.

In examples, the computing system 145, which either may be integrated within HPC system 105 (not shown) or may be external to yet communicatively coupled with HPC system 105 (as shown in FIG. 1, either directly coupled or coupled via network(s) 155a), is configured to control the operation of the WSSs 135a-135y and the OCSs 140a-140y (e.g., via communication channels denoted in FIG. 1 by dashed lines between computing system 145 and each of WSS(s) 135a-135y and OCSs 140a-140y) to perform optical switching to couple GPUs in the network topologies described herein. In some examples, computing system 145 may also function to perform pooling of two or more GPUs together (whether all within a single network topology or all within each stage or portion of a plurality of stages or portions of a network topology) and/or to perform multithreading in each of one or more GPUs in a network topology. In some cases, computing system 145 may be further configured to receive, from a user device 165 among the user devices 165a-165s and via network(s) 155a and 155b and interface 160, input regarding a network topology to form using the HPC system 105. In examples, I/O device(s) 150, which either may be integrated within HPC system 105 (not shown) or may be external to yet communicatively coupled with HPC system 105 (as shown in FIG. 1, either directly coupled or coupled via network(s) 155a), may be configured to receive, from a user device 165 among the user devices 165a-165s and via network(s) 155a and 155b and interface 160, input data and/or input prompts for inputting (e.g., via communication channels denoted in FIG. 1 by long dashed lines between I/O device(s) 150 and each GPU server 110a-110t) into the network topology of GPUs that is formed by computing system 145 using the HPC system 105. The I/O device(s) 150 may be further configured to subsequently output, to the user device 165 and via network(s) 155a and 155b and interface 160, results of the computations by the GPUs over the network topology formed by the HPC system 105.

In some cases, the computing system 145, as an internal or integrated component of HPC system 105, includes at least one of an orchestrator or an HPC controller. The computing system 145, as an external component separate from yet communicatively coupled with HPC system 105, includes at least one of an orchestrator, an HPC controller, a server, an AI system, a cloud computing system, or a distributed computing system. Networks 155a and/or 155b (collectively, "network(s) 155") may each include at least one of a distributed computing network, such as the Internet, a private network, a commercial network, or a cloud network, and/or the like. Interface system 160 may include a gateway device or a network interface device. In some instances, the one or more user devices 165 each includes one of a desktop computer, a laptop computer, a tablet computer, a smart phone, a mobile phone, or any suitable device capable of communicating with network(s) 155a and/or 155b (and interface system 160) or with HPC system 105, computing system 145, I/O device(s) 150, or other network devices within network(s) 155a. In some examples, the one or more user devices 165 may communicate using an app-based portal, a web-based portal, an application programming interface ("API"), a server, an app, or any other suitable communications interface (none shown), over network(s) 155. In some cases, user 170 may include an individual, a group of individuals, or agent(s), representative (s), owner(s), and/or stakeholder(s), or the like, of any suitable entity. The entity may include a private company, a group of private companies, a public company, a group of public companies, an institution, a group of institutions, an association, a group of associations, a governmental agency, or a group of governmental agencies.

In operation, computing system 145 and/or HPC system 105 may perform methods for implementing AI clusters using ultra-scalable HPC network or system based on DWDM, as described in detail with respect to FIGS. 2A-4C. For example, the following functionalities may be applied with respect to the operations of system 100 of FIG. 1. FIG. 2 as described below is directed to various example components and configurations of the ultra-scalable HPC network or system of FIG. 1. FIGS. 3A and 3B are directed to various example HPC networks or systems 300A and 300B that may be used for implementing AI clusters based on DWDM, while FIGS. 3C-3W are directed to various example network topologies 300C-300W that may be automatically and selectively configured using the ultra-scalable HPC network or system of FIGS. 1-3B. FIGS. 4A-4C as described below are directed to the method for implementing AI clusters using ultra-scalable HPC network or system based on DWDM.

FIGS. 2A-2H depict various example components and configurations 200A-200H of the ultra-scalable HPC network or system of FIG. 1. In some embodiments, GPU devices 115a-115u or 115a-115m, GPUs 120a-120v or 120a-120n or 120a-120d, mux/demux devices 125a-125w or 125, amplifiers 130a-130x or 130, WSSs 135a-135y, 135, 135', or 135a-135o, OCSs 140a-140z, 140a-140o, 140, 140', or

140", computing system 145, and I/O device(s) 150 of FIGS. 2A-2H may be similar, if not identical, to the one or more GPU devices 115a-115u, the one or more GPUs 120a-120v, the one or more mux/demux devices 125a-125w, the one or more amplifiers 130a-130x, the one or more WSSs 135a-135y, the one or more OCSs 140a-140z, computing system 145, and I/O device(s) 150, respectively, of example system 100 of FIG. 1, and the description of these components of example system 100 of FIG. 1 are similarly applicable to the corresponding components of FIGS. 2A-2H.

Figure 2A:
FIGS. 2A-2H depict various example components and configurations of the ultra-scalable HPC network or system of FIG. 1.

FIG. 2A depicts a schematic diagram showing example sets of relationships between GPU servers 110 and GPU devices 115, between GPU devices 115 and GPUs 120, between at least one of GPUs 120, GPU devices 115, and/or GPU servers 110 and mux/demux devices 125, and between mux/demux devices 125 and amplifiers 130. For example, with reference to the non-limiting example components and configurations 200A of FIG. 2A, I/O device(s) 150 is communicatively coupled to each GPU server 110, as denoted in FIG. 2A by long dashed lines between I/O device(s) 150 and each GPU server 110a-110t. In examples, GPU server 110a and/or GPU devices 115a-115u included therein are communicatively coupled to mux/demux device 125a, while GPU server 110t and/or GPU devices 115a-115m included therein are communicatively coupled to mux/demux device 125w, and so on. In some examples, each amplifier 130 is communicatively coupled with a corresponding mux/demux device 125, in which case x equals w. In some cases, multiple mux/demux devices 125 may be communicatively coupled to each amplifier (not shown), in which case w is greater than x.

In examples, each GPU device 115 may include a number of GPUs 120 that may be the same as, or different from, a number of GPUs 120 in another GPU device 115 in the HPC system 105. For example, in the non-limiting example of FIG. 2A, each of GPU devices 115a and 115u within GPU server 110a may include v number of GPUs, while GPU device 115a in GPU server 110t may include 1 GPU 120a, and GPU device 115m in GPU server 110t may include n number of GPUs, where v and n are different integer values. Likewise, each GPU server 110 may include a number of GPU devices 115 that may be the same as, or different from, a number of GPU devices 115 in another GPU server 110 in the HPC system 105. For example, in the non-limiting example of FIG. 2A, GPU server 110a may include u number of GPU devices 120, while GPU server 110t may include m number of GPU devices 120, where u and m are different integer values. In some cases, the number of GPUs 120 in a GPU device 115 (e.g., a, n, or v, as shown in FIG. 2A) or a GPU server 110 (e.g., 2v+total number of other GPUs in GPU devices 115b-115[u-1] in GPU server 110a, a+n+total number of other GPUs in GPU devices 115b-115[m-1] in GPU server 110t, as shown in FIG. 2A) may range from 1 to 64 or more (e.g., 1, 4, 8, 16, 32, 64, or more). In examples, the number of GPU devices 115 in a GPU server 110 (e.g., u or m, as shown in FIG. 2A) may range from 1 to 4 or more (e.g., 1, 2, 3, 4, or more). Herein, GPU servers 110 having a single GPU device 115 may each be referred to as either a GPU server 110 or a GPU device 115.

FIG. 2A further depicts example sets of relationships between at least one of mux/demux devices 125 or amplifiers 130 and WSSs 135, between WSSs 135 and OCSs 140, between I/O device(s) 150 and GPU servers 110, and between computing system 145 and at least one of HPC system 105, WSSs 135, and/or OCSs 140. For example, with reference to the non-limiting example components and configurations 200A of FIG. 2A, multiple mux/demux devices 125 and/or amplifiers 130 may be communicatively coupled with each of the WSSs 135 (in this case, mux/demux devices 125a-125c are communicatively coupled with WSS 135a via corresponding amplifiers 130a-130c). As denoted by the ellipses ("..."), many more mux/demux devices 125 and/or amplifiers 130 may be communicatively coupled with each WSS 135. In examples, each WSS 135 is communicatively coupled with multiple OCSs 140, with each OCS 140 being communicatively coupled with multiple WSSs 135, in a cross-connect manner between the plurality of WSSs 135a-135y and the plurality of OCSs 140a-140z. In such a manner, any WSS 135 (and thus any corresponding GPU 120 or corresponding GPU device 115 in the HPC system 105) may be communicatively connected (in a selective and/or dynamic way) with any other WSS 135 (and thus any corresponding GPU 120 or corresponding GPU device 115 in the HPC system 105) via one or more OCSs 140a-140z. In FIG. 2A, different line types are used for purposes of illustration to denote the above-mentioned cross-connection between the plurality of WSSs 135a-135y and the plurality of OCSs 140a-140z. In some examples, y is greater than z. With further reference to the non-limiting example components and configurations 200A of FIG. 2A, computing system 145 is communicatively coupled to each WSS 135 and to each OCS 140a, as denoted in FIG. 2A by dashed lines between computing system 145 and each WSS 135a-135y and between computing system 145 and each OCS 140a-140z.

Figure 2B:
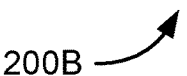

FIGS. 2B-2H depict the various components of HPC system 105 in greater detail. For instance, with reference to the non-limiting example components or configurations 200B of FIG. 2B, GPU device 115, which may be one of GPU devices 115a-115u or 115a-115m of FIG. 2 or one of GPU devices 115a-115u of FIG. 1, includes two or more GPUs 120 (in this case, 4 GPUS 120a-120d) that are interconnected with each other via a serializer/deserializer ("Serdes") 205 and via connectors 210. In some cases, such as shown in FIG. 2B, portions of the Serdes 205 may surround each GPU 120 (e.g., Serdes portions 205a-205d each surrounding corresponding GPUs 120a-120d). GPU device 115 further includes two or more optoelectronic devices or optics 215 (in this case, 4 optoelectronic devices 215a-215d), each communicatively coupling corresponding GPUs 120 (in this case, GPUs 120a-120d, respectively) with mux/demux device 125, which may be similar to mux/demux devices mux/demux devices 125a-125w or 125 of FIGS. 1 and 2A. As shown in FIG. 2B, optical signals 220a-220d are transmitted from optoelectronic devices 215a-215d, respectively, to mux/demux 125, while optical signals 225a-225d are received by optoelectronic devices 215a-215d, respectively, from mux/demux 125.

Figure 2C:
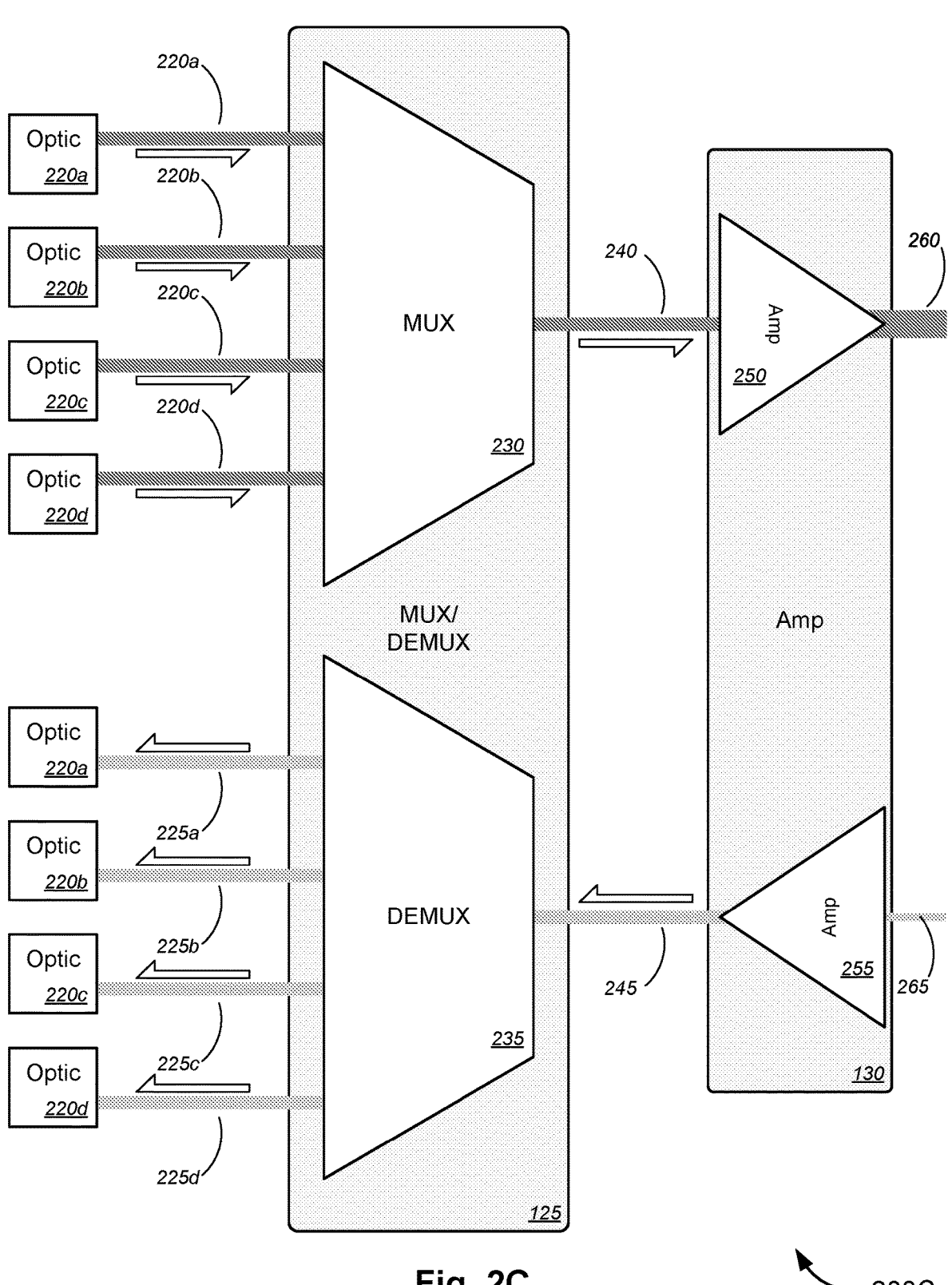

Turning to the non-limiting example components or configurations 200C of FIG. 2C, optical signals 220a-220d that are respectively transmitted from optoelectronic devices 215a-215d are received by mux 230 of mux/demux device 125 and relayed as multiplexed optical signal 240 to amplifier 250 of amplifier 130. Amplifier 250 amplifies multiplexed optical signal 240 to output (amplified multiplexed) optical signal 260. Amplifier 255 of amplifier 130 may receive and amplify optical signal 265 to output (amplified) optical signal 245, which is received by demux 235 of mux/demux device 125 and relayed as (demultiplexed) optical signals 225a-225d to optoelectronic devices 215a-215d, respectively.

Figure 2D:
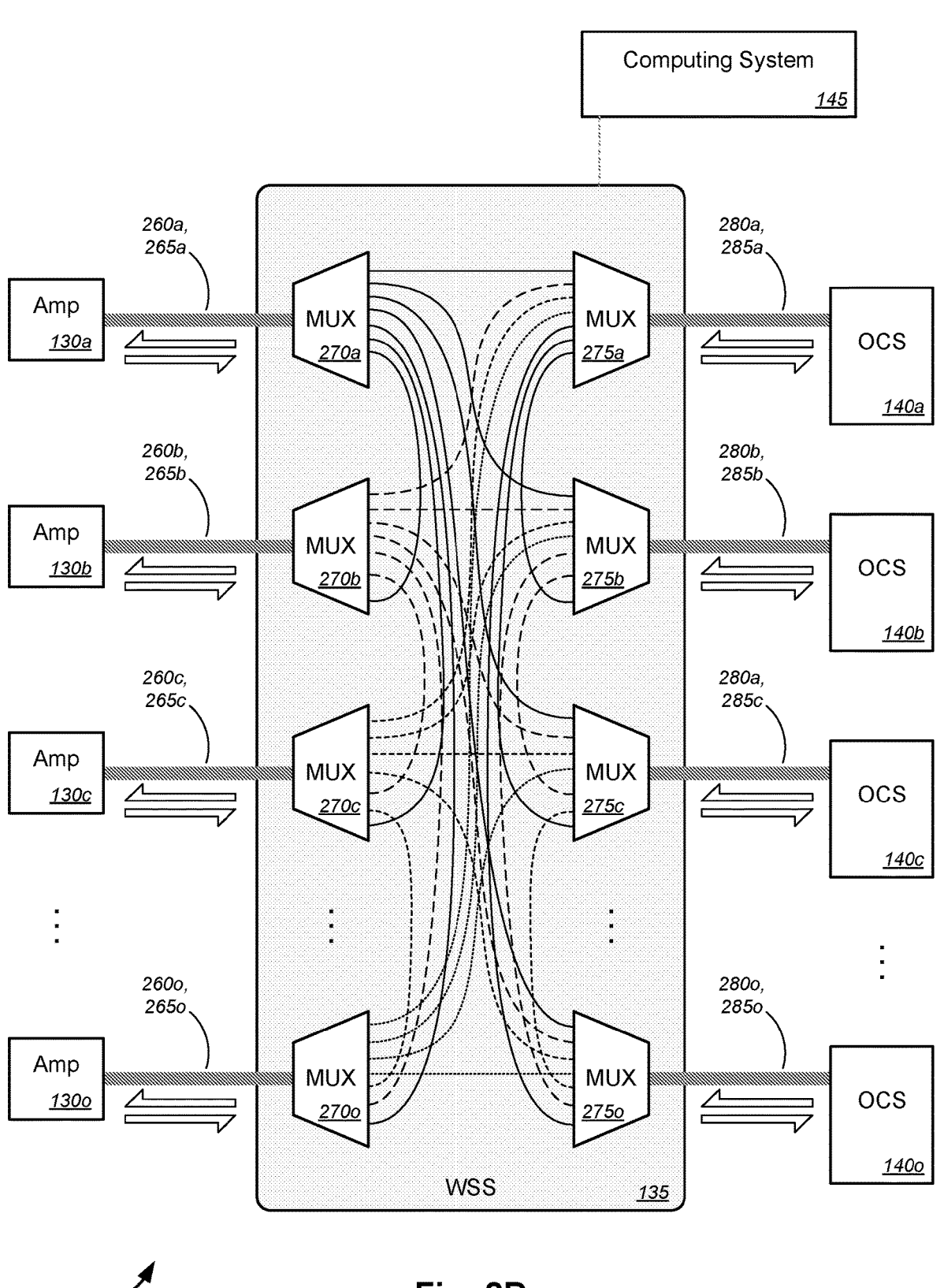
Figure 2E:
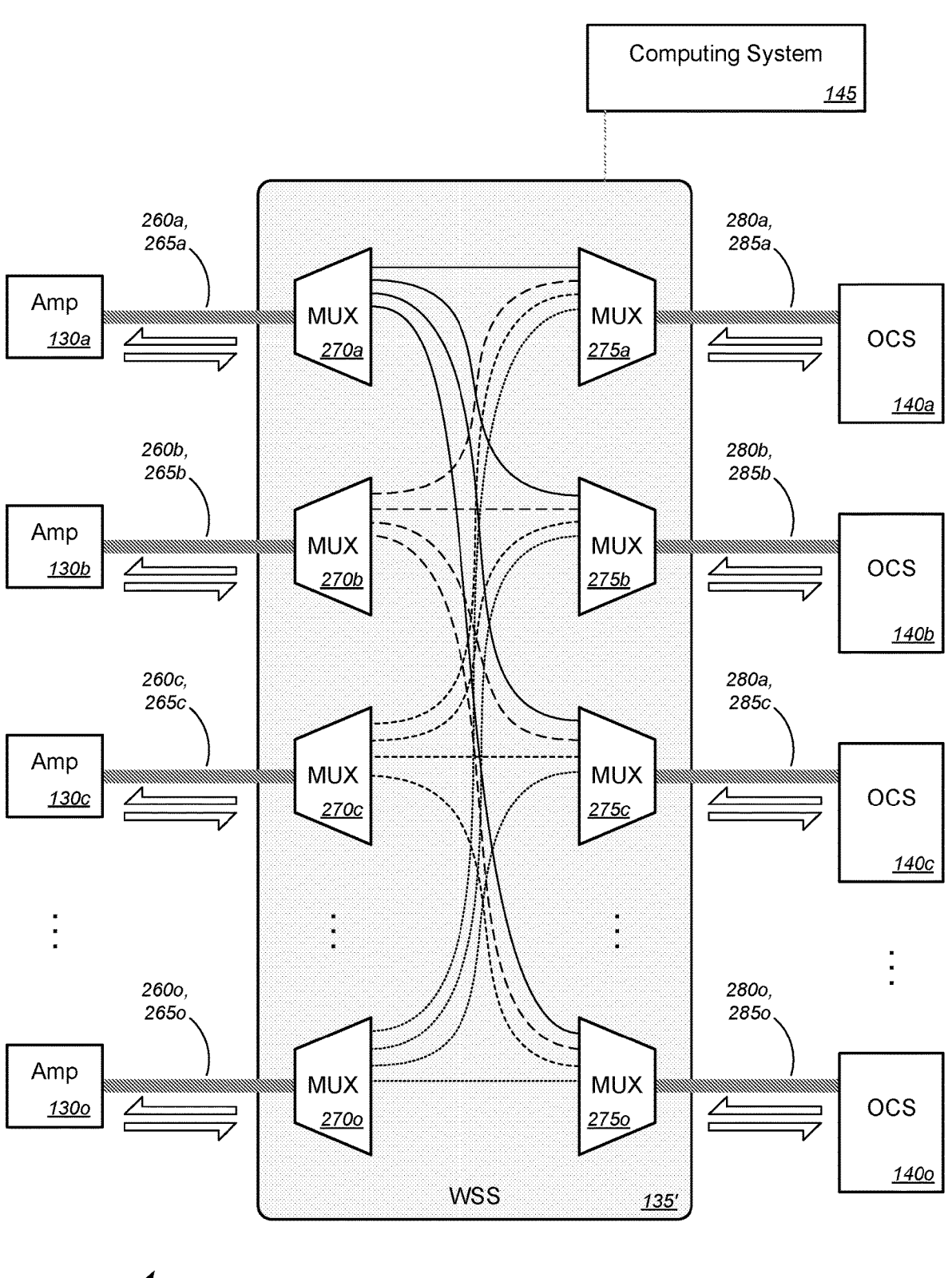

Referring to the non-limiting example components or configurations 200D and 200E of FIGS. 2D and 2E, respectively, amplifiers 130a-130o may relay optical signals 260a-

260o, respectively, to corresponding mux/demux devices 270a-270o of WSS 135 or 135', where o is a non-negative integer. For WSS 135 of FIG. 2D, computing system 145 is used to selectively control switching of mux/demux devices 270a-270o and 275a-275o in WSS 135 to route the optical signals from one of mux/demux devices 270a-270o to any other of mux/demux devices 270a-270o or any of mux/demux devices 275a-275o. On the other hand, for WSS 135' of FIG. 2E, computing system 145 is used to selectively control switching of mux/demux devices 270a-270o and 275a-275o in WSS 135' to route the optical signals from one of mux/demux devices 270a-270o to any of mux/demux devices 275a-275o, without directly routing to any other of mux/demux devices 270a-270o. In FIGS. 2D and 2E, different line types are used for purposes of illustration to denote cross-connection between the two of the mux/demux devices (e.g., mux/demux devices 270a-270o and 275a-275o).

Optical signals received by mux/demux devices 275a-275o may be relayed as optical signals 280a-280o to corresponding OCSs 140a-140o. Optical signals 285a-285o are subsequently output by corresponding OCSs 140a-140o and received by mux/demux devices 275a-275o. In WSS 135 of FIG. 2D, computing system 145 is used to selectively control switching of the optical signals from one of mux/demux devices 275a-275o to any other of mux/demux devices 275a-275o or any of mux/demux devices 270a-270o. On the other hand, in WSS 135' of FIG. 2E, computing system 145 is used to selectively control switching of the optical signals from one of mux/demux devices 275a-275o to any of mux/demux devices 270a-270o, without directly switching to any other of mux/demux devices 275a-275o. Optical signals received by mux/demux devices 270a-270o may be relayed as optical signals 265a-265o to corresponding amplifiers 130a-130o. Herein, optical signals 285a-285o may not necessarily correspond to optical signals 280a-280o, respectively, as OCSs 140a-140o may connect different WSSs 135 together, such as shown, e.g., in FIG. 2A. Likewise, optical signals 265a-265o may not necessarily correspond to optical signals 260a-260o, respectively, as OCSs 140a-140o and/or WSS 135 may be controlled to switch connections to other GPU devices 115 or GPUs 120.

For WSS 135 of FIG. 2D, GPU devices 115 or GPUs 120 (e.g., GPU devices 115 or GPUs 120 of FIG. 2B) that are communicatively coupled to two different mux/demux devices 270 of the same WSS 135 may be connected together merely by selecting which output of (the demux of) the first mux/demux device 270 to route through without necessarily using one of the OCSs 140 coupled to the WSS 135. However, for WSS 135' of FIG. 2E, to connect GPU devices 115 or GPUs 120 that are communicatively coupled to two different mux/demux devices 270 of the same WSS 135', one of the OCSs 140 must be used to bridge the connection, by routing through the same or different mux/demux 275 to connect with the second mux/demux device 270.

Figure 2F:
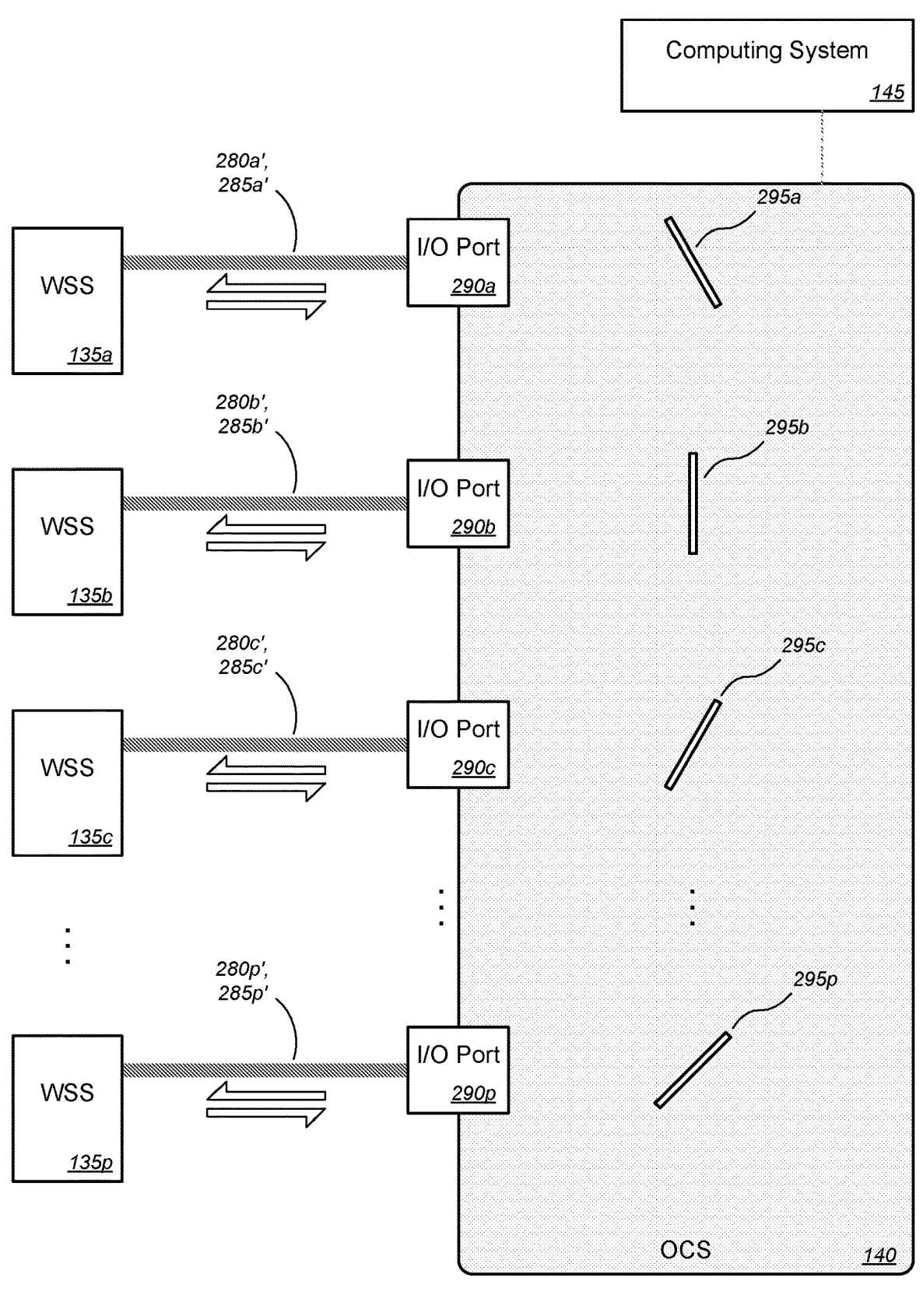
Figure 2G:
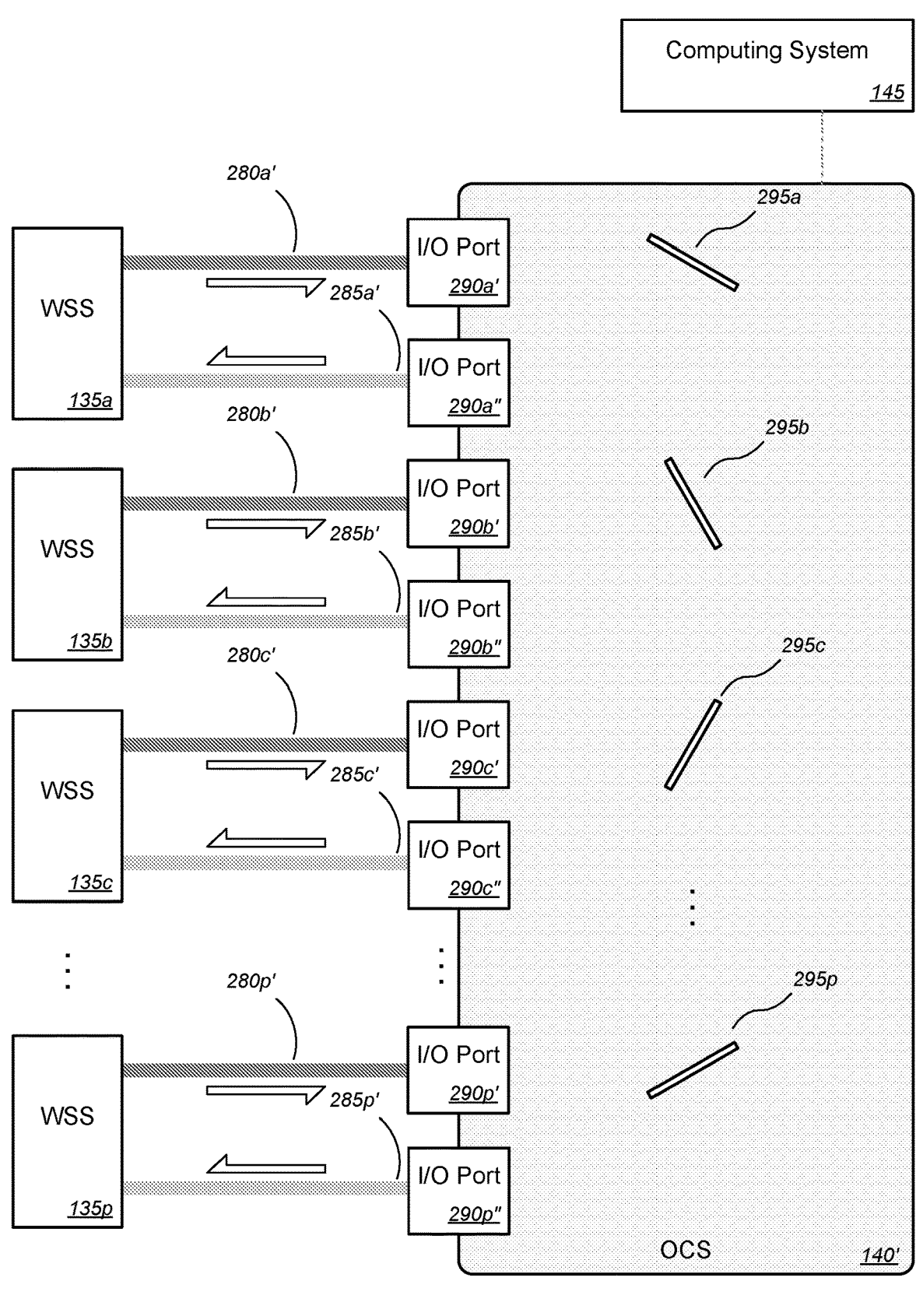

With reference to the non-limiting example components or configurations 200F and 200G of FIG. 2F and 2G, respectively, WSS 135a-135p, each of which may be similar to WSS 135 FIG. 2D or WSS 135' of FIG. 2E, may relay optical signals 280a'-280p', respectively, to corresponding I/O ports 290a-290p of OCS 140. Computing System 145 is used to selectively control mirrors 295a-295p of OCS 140 to route the optical signals 280a'-280p' that are received by I/O ports 290a-290p, respectively, to any of I/O ports 290a-290p, including the initially receiving port, as each port 290a-290p is a duplex optical port. Optical signals received by I/O ports 290a-290p from mirrors 295a-295p may be relayed as optical signals 285a'-285p', respectively, to corresponding WSSs 135a-135p. Herein, similar to other optical signals described above, optical signals 285a'-285p' may not necessarily correspond to optical signals 280a'-280p', respectively, as mirrors 295a-295p of OCS 140 may be controlled to route each of one or more of optical signals 280a'-280p' to an I/O port among I/O ports 290a-290p other than the I/O port from which it is received by corresponding mirror among mirrors 295a-295p.

Referring to FIGS. 2F and 2G, I/O ports 290a-290p of FIG. 2F are expanded in FIG. 2G to include input I/O ports 290a'-290p' and output I/O ports 290a"-290p". As shown in FIG. 2G, input I/O ports 290a'-290p' may receive and relay optical signals 280a'-280p' from corresponding WSSs 135a-135p to corresponding mirrors 295a-295p of OCS 140'. Each mirror 295 among mirrors 295a-295p may be controlled by computing system 145 to route corresponding relayed optical signal 280 among optical signals 280a'-280p' to any of output I/O ports 290a"-290p". Optical signals received by I/O ports 290a"-290p" may be relayed as optical signals 285a'-285p', respectively, to corresponding WSSs 135a-135p.

Figure 2H:
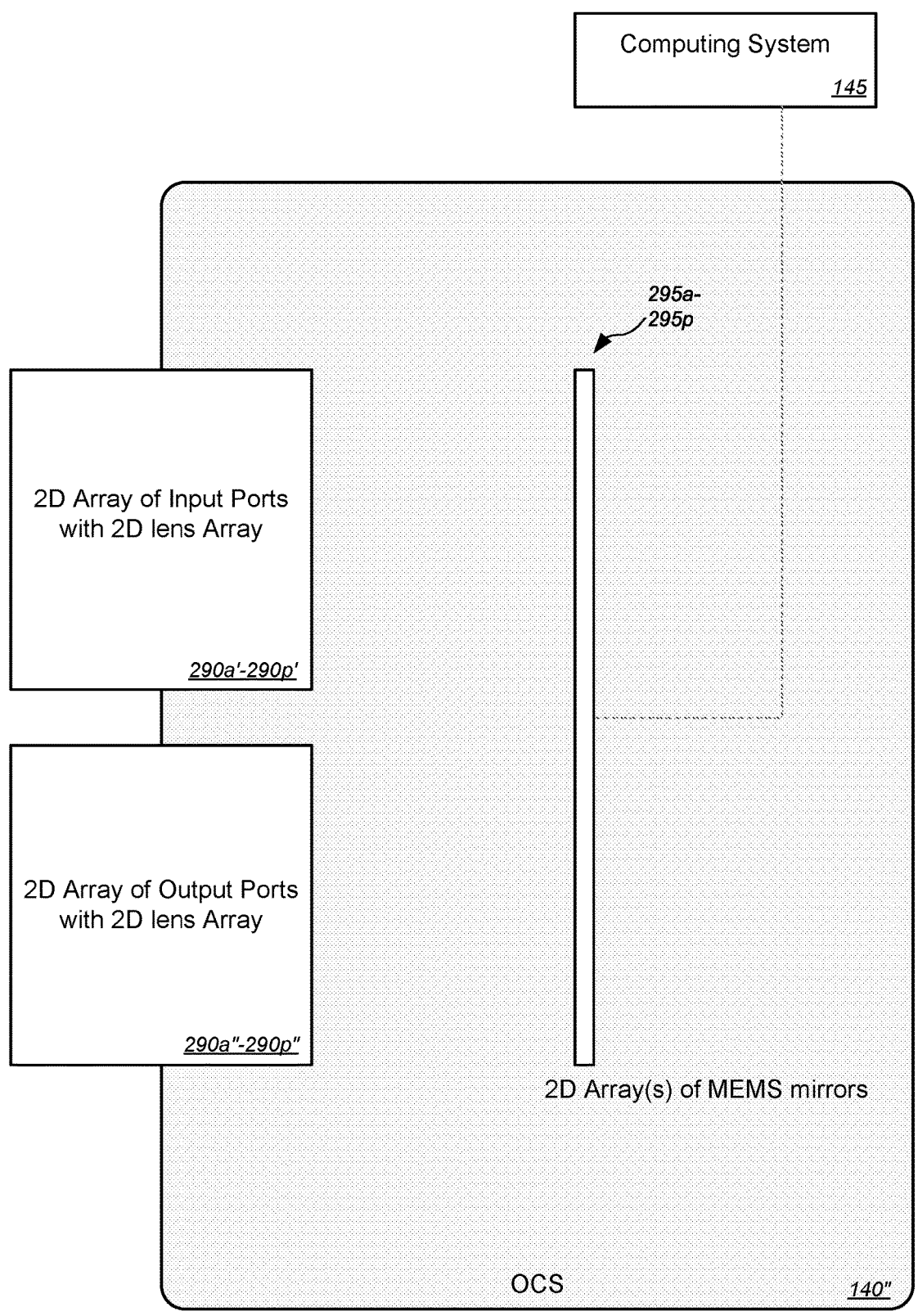

In examples, mirrors 295a-295p include MEMS mirrors. In some cases, the MEMS mirrors may be configured as separate MEMS mirrors each corresponding to a set of input and output I/O ports (e.g., a set of I/O ports 290a' and 290a"). In an example, the MEMS mirrors may be configured as an array of MEMS mirrors each corresponding to a set of input and output I/O ports (e.g., a set of I/O ports 290a' and 290a"). In another example, the MEMS mirrors may be configured as a set of arrays of MEMS mirrors each set including input array of MEMS mirrors, an output array of MEMS mirrors, and one or more static intermediate mirrors for relaying and dynamically routing optical signals from input I/O ports 290a'-290p' to output I/O ports 290a"-290p". For embodiments with MEMS mirrors configured as one or more arrays of MEMS mirrors, the input and output I/O ports 290a'-290p' and 290a"-290p" are also arranged in corresponding arrays, as shown, e.g., in the non-limiting example components or configurations 200H of FIG. 2H. In FIG. 2H, OCS 140" includes a two-dimensional ("2D") array of input ports with 2D lens array 290a'-290p', a 2D array of output ports with 2D lens array 290a"-290p", one or more 2D arrays of MEMS mirrors 295a-295p that are controllable by computing system 145 (as denoted in FIG. 2H by the dashed line between computing system 145 and the one or more 2D arrays of MEMS mirrors 295a-295p).

In FIG. 2A, the lines connecting the various components denote either digital signal connections or optical signal connections. In FIGS. 2B-2G, the optical signals (e.g., optical signals 220a-220d, 225a-225d, 240, 245, 260 and 260a-260o, 265 and 265a-265o, 280a-280o, and 290a-290o) are shown merely for illustration to represent possible optical signal paths between the various components of HPC system 105. During operation, in some instances, optical signals may be relayed between some, but not necessarily all, of the adjacent components of HPC system 105. In an example, optical signals may be relayed along one path but not along adjacent paths for that component (e.g., GPU device 115, GPU server 110, mux/demux device 125, WSS 135, or OCS 140). In another example, optical signals may be relayed along multiple adjacent paths for that component. In yet another example, optical signals may be relayed along all adjacent paths for that component (e.g., along the possible optical signal paths for that component as shown in FIGS. 2B-2G).

Figure 3A:
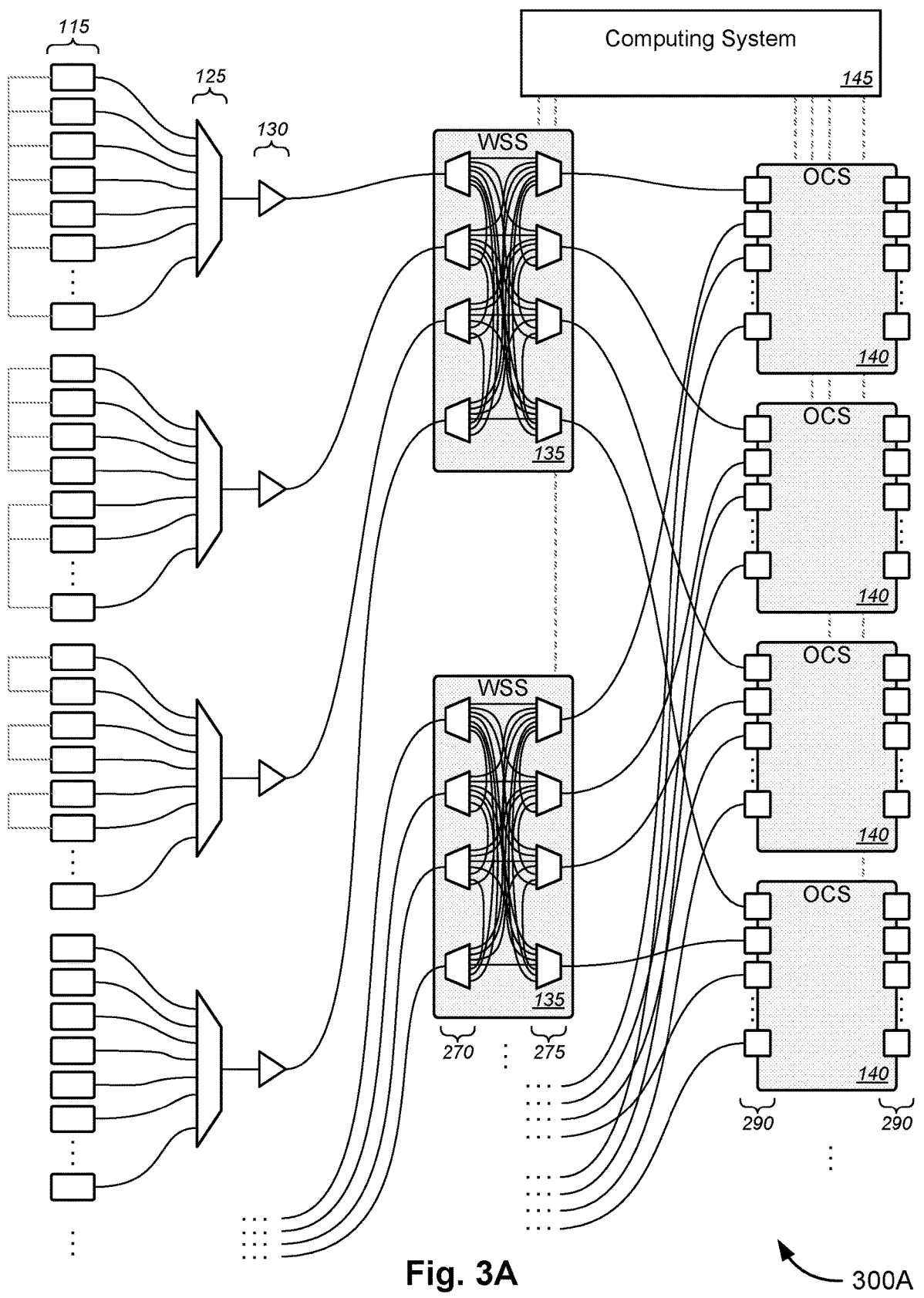
FIGS. 3A and 3B depict various example HPC networks or systems that may be used for implementing AI clusters based on DWDM.
Figure 3B:
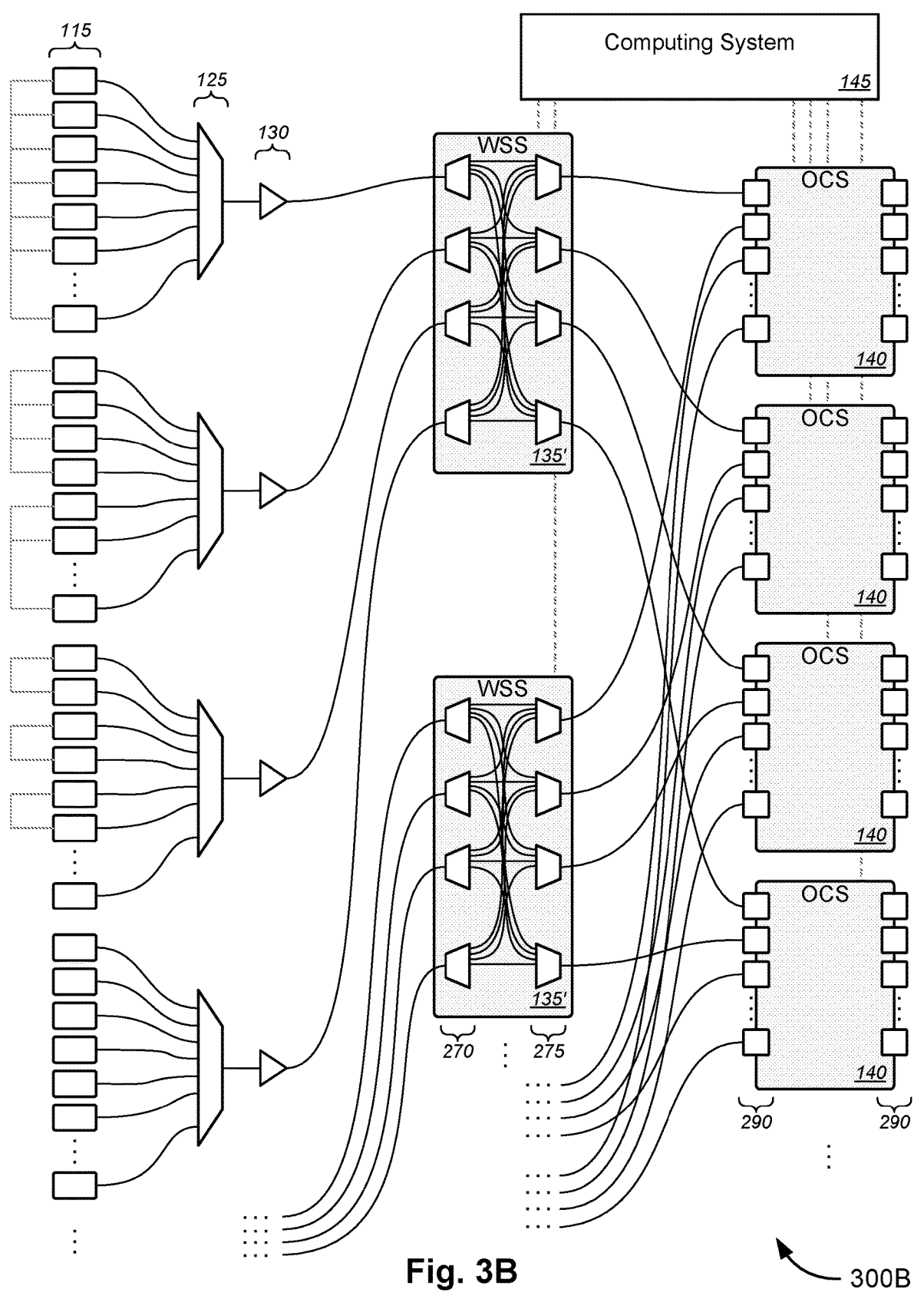
Figures 3C, 3D, 3E, 3F, 3G, 3H, 3I, 3J, 3K, 3L, 3M:
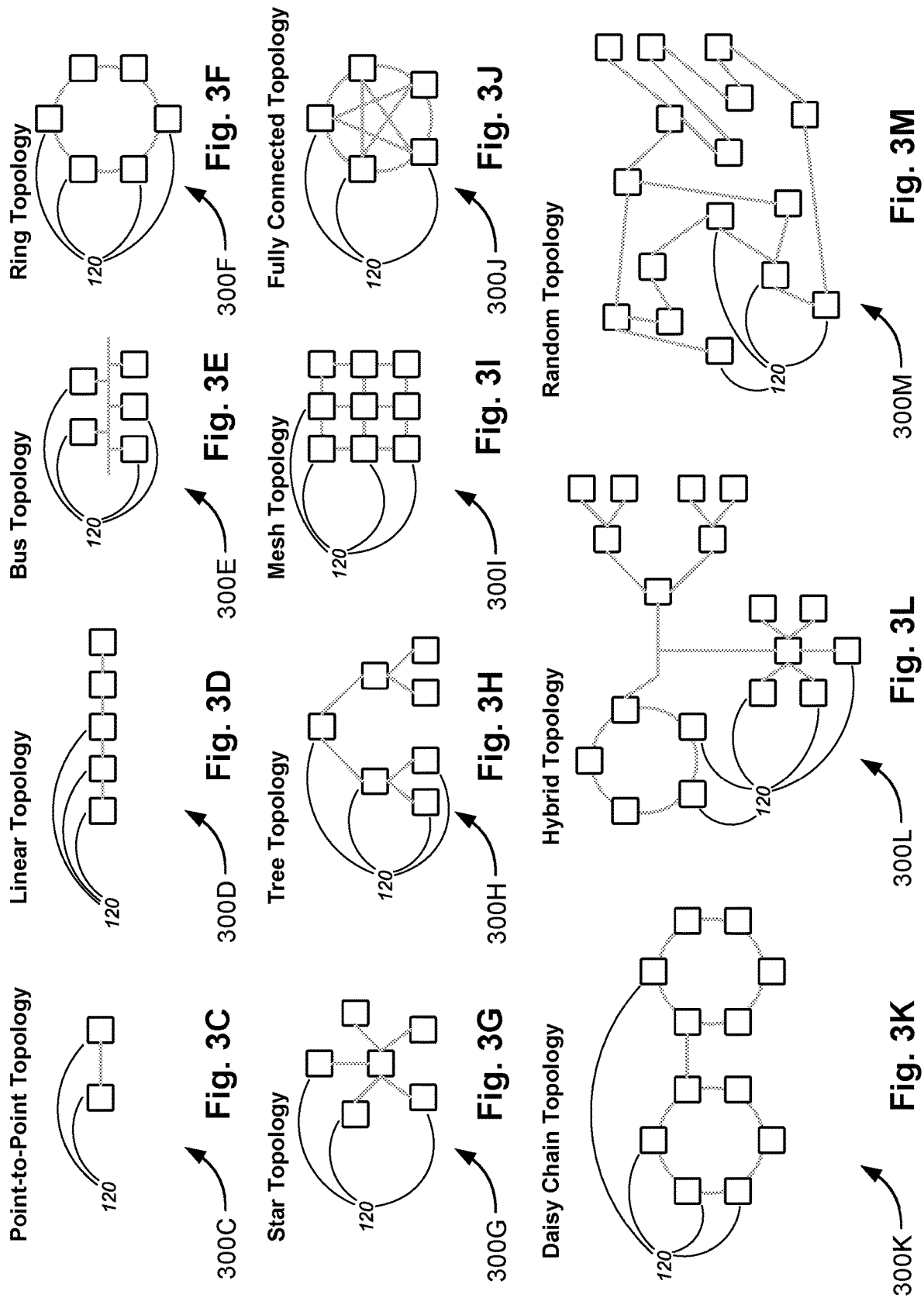

FIGS. 3A and 3B depict various example HPC networks or systems 300A and 300B that may be used for implementing AI clusters based on DWDM. FIGS. 3C-3W depict various example network topologies 300C-300W that may be automatically and selectively configured using the ultra-scalable HPC network or system 300A or 300B for implementing AI clusters based on DWDM.

In some examples, GPU devices 115, GPUs 120, mux/demux devices 125, amplifiers 130, WSSs 135, OCSs 140, and computing system 145 of FIGS. 3A-3W may be similar, if not identical, to the one or more GPU devices 115a-115u, the one or more GPUs 120a-120v, the one or more mux/demux devices 125a-125w, the one or more amplifiers 130a-130x, the one or more WSSs 135a-135y, the one or more OCSs 140a-140z, and computing system 145, respectively, of example system 100 of FIG. 1, and the description of these components of example system 100 of FIG. 1 are similarly applicable to the corresponding components of FIGS. 3A-3W. In some embodiments, GPU devices 115, GPUs 120, mux/demux devices 125, amplifiers 130, WSSs 135, OCSs 140, computing system 145, mux/demux devices 270 and 275, and I/O ports 290 of FIGS. 3A-3W may be similar, if not identical, to the one or more GPU devices 115a-115u or 115a-115m, the one or more GPUs 120a-120v or 120a-120n or 120a-120d, the one or more mux/demux devices 125a-125w or 125, the one or more amplifiers 130a-130x or 130, the one or more WSSs 135a-135y, 135, 135', or 135a-135p, OCSs 140a-140z, 140a-1400, 140, 140', or 140", computing system 145, mux/demux devices 270a-270o and 275a-275o, and I/O ports 290a-290p, 290a'-290p', and 290a"-290p", respectively, of FIGS. 2A-2H, and the description of these components of example components and configurations 200A-200H of FIGS. 2A-2H are similarly applicable to the corresponding components of FIGS. 3A-3W.

With reference to the non-limiting example of FIG. 3A, example HPC network or system 300A for implementing AI clusters based on DWDM may include a plurality of GPU devices 115, a plurality of GPU mux/demux devices 125, a plurality of amplifiers 130, a plurality of WSS 135 each including a first set of WSS mux/demux devices 270 and a second set of WSS mux/demux devices 275, a plurality of OCSs 140 each including I/O ports 290, and computing system 145. As shown in FIGS. 1, 2A, and 2B, GPU devices 115 may each include one or more GPUs 120, and a number of GPU devices 115 may be integrated within one of a number of GPU servers 110. As shown in FIG. 3A, a set of GPU devices 115 may be communicatively coupled to each of the plurality of GPU mux/demux devices 125, where the number of GPU devices 115 in one set that is communicatively coupled to one GPU mux/demux device 125 may be the same as, or different from, the number of GPU devices in another set that is communicatively coupled to another GPU mux/demux device 125. In some cases, all GPU devices in a set are communicatively coupled to each other (as denoted in FIG. 3A by lines to the left of these components connecting all GPU devices 115). In other cases, some, but not all, of the GPU devices in a set are communicatively coupled to each other (as denoted in FIG. 3A by lines to the left of these components connecting some, but not all, of GPU devices 115). In yet other cases, none of the GPU devices in a set are communicatively coupled to each other (as denoted in FIG. 3A by a lack of lines to the left of these connecting the GPU devices 115).

In examples, each GPU mux/demux device 125 is communicatively coupled, via an amplifier 130, with a WSS mux/demux device 270 among the plurality of WSS mux/ demux devices 270 distributed across the plurality of WSSs 135. In example HPC network or system 300A of FIG. 3A, each WSS mux/demux device 270 of each WSS 135 is communicatively coupled with each of WSS mux/demux device 275, as well as with each of the other WSS mux/demux devices 270, within the same WSS 135 (as denoted in FIG. 3A by the interconnected lines connecting the WSS mux/demux devices 270 and 275 within each WSS 135). Each WSS mux/demux device 275 is communicatively coupled with an I/O port 290 of one OCS 140 among the plurality of I/O ports 290 distributed across the plurality of OCSs 140. In examples, the WSSs are meshed together so that contentionless switches can be created, e.g., by switching any wavelength of light to any port outside of these WSSs to avoid, minimize, or eliminate wavelength block of the same wavelength of light. As described above, computing system 145 controls each WSS 135 and each OCS 140 to route optical signals along particular paths across this network of connections to connect a number of GPU devices 115 (and underlying GPUs 120) together in a particular network topology (such as one of the network topologies shown and described below with respect to FIGS. 3C-3W) for computing a series of computations.

Turning to the non-limiting example of FIG. 3B, HPC network or system 300B is similar to HPC network or system 300A of FIG. 3A, except that where WSS 135 of HPC network or system 300A corresponds to the WSS 135 of example components or configurations 200D of FIG. 2D, WSS 135' of HPC network or system 300B corresponds to the WSS 135' of example components or configurations 200E of FIG. 2E. Accordingly, for WSS 135, GPU devices 115 or GPUs 120 that are communicatively coupled to two different mux/demux devices 270 of the same WSS 135 may be connected together merely by selecting which output of (the demux of) the first mux/demux device 270 to route through without necessarily using one of the OCSs 140 coupled to the WSS 135. For WSS 135', however, one of the OCSs 140 must be used to bridge the connection. In other words, a first GPU device 115 or first GPU 120 must be connected with a second GPU device 115 or second GPU 120 through first mux/demux device 125 and first amplifier 130, through WSS 135' (e.g., through first mux/demux device 270 and first mux/demux device 275), relayed by OCS 140 (e.g., through the input port of one I/O port 290 and out the output port of the same I/O port 290), back through the first mux/demux device 275, through a second mux/demux device 270, and through a second amplifier 130 and corresponding second mux/demux device 125).

Referring to the non-limiting examples of FIGS. 3C-3W, the plurality of network topologies includes at least one of a point-to-point network topology 300C, a linear network topology 300D, a bus network topology 300E, a ring network topology 300F, a star network topology 300G, a tree network topology 300H, a mesh network topology 300I, a fully connected network topology 300J, a daisy-chain network topology 300K, a hybrid network topology 300L, a random network topology 300M, a torus network topology 300N, a spiral network topology 300O, a butterfly network topology 300P, a hypercube network topology 300Q, a Clos/Benes network topology 300R, a Kautz network topology 300S, a fat tree network topology 300T, a flat fly network topology 300U, a slim fly network topology 300V, a dragonfly network topology 300W, or other network topology that combines two or more of these network topologies.

In examples, a point-to-point network topology 300C may be formed by linking two GPUs (e.g., GPUs 120 or GPU devices 115) together (e.g., the linked pair of GPUs as shown in FIG. 3C). A linear network topology 300D may be formed by linking three or more GPUs one after another in a sequence (e.g., a line-like connection, as shown in FIG. 3D). A bus network topology 300E may be formed by linking three or more GPUs together via a common connection (e.g., a network bus-like connection, as shown in FIG. 3E). A ring network topology 300F may be formed by linking a plurality of GPUs one after another in a closed circle or loop (e.g., a ring-shaped connection, as shown in FIG. 3F). A star network topology 300G may be formed by linking a plurality of GPUs each connected to a central GPU (e.g., a star-shaped or hub-and-spokes connection, as shown in FIG. 3G). A tree network topology 300H may be formed by linking a plurality of GPUs branching out from a node GPUs with node GPUs branching out from other node GPUs or a root GPU (e.g., a tree-like connection, as shown in FIG. 3H). A mesh network topology 300I may be formed by linking a plurality of GPUs in a grid pattern (e.g., a two-dimensional ("2D") mesh-like connection, as shown in FIG. 3I). A fully connected network topology 300J may be formed by linking a plurality of GPUs where each GPU is connected with each other GPU in the connected network (e.g., a circled and interconnected polygon connection (e.g., a circled and interconnected pentagram connection, as shown in FIG. 3J)). A daisy-chain network topology 300K may be formed by linking a first plurality of GPUs in a first network topology with at least a second plurality of GPUs in a second network topology that is the same as the first network topology in sequence (e.g., first and second pluralities of GPUs arranged in a connected pair of the same topologies (e.g., a connected pair of ring topologies, as shown in FIG. 3K)). A hybrid network topology 300L may be formed by linking two or more pluralities of GPUs in two or more different network topologies either linked together by one or more connections (e.g., connected set of multiple pluralities of GPUs of two or more different topologies (e.g., connected set of ring, star, and tree topologies, as shown in FIG. 3L)). A random network topology 300M may be formed by linking a plurality of GPUs in a random or unpatterned manner (e.g., a random connection, as shown in FIG. 3M).

A torus network topology 300N may be formed by linking a plurality of GPUs arranged and connected in a grid connection with the ends of each row connected to each other and the ends of each column connected to each other in a pattern known as a torus network (e.g., as shown in FIG. 3N). A spiral network topology 300O may be formed by linking a plurality of GPUs together in a sequence similar to the linear topology but in a spiral pattern through a network (e.g., a spiral connection, as shown in FIG. 3O). A butterfly network topology 300P may be formed by linking a plurality of GPUs connected in two ranks of GPUs with some GPUs in the two ranks being separated in a butterfly formation in a pattern known as a butterfly network (e.g., as shown in FIG. 3P). A hypercube network topology 300Q may be formed by linking a first plurality of GPUs arranged in an outer cube formation that is connected with a second plurality of GPUs arranged in an inner cube formation within the outer cube formation (e.g., a hypercube connection, as shown in FIG. 3Q). A Clos/Benes network topology 300R may be formed by linking a plurality of GPUs in a multistage configuration that simulates a cross-bar switching or multistage circuit switching pattern known as a Benes network (e.g., as shown in FIG. 3R). A Kautz network topology 300S may be formed by linking a plurality of GPUs arranged in two rings with an outer ring of GPUs set in a direction opposite a direction of an inner ring of GPUs with each inner ring GPU connected with a corresponding outer ring GPU in a pattern known as a Kautz network (e.g., as shown in FIG. 3S). A fat tree network topology 300T may be formed by linking a plurality of GPUs with intercon- nected sets of GPUs branching out from some node or root GPUs in a pattern known as a fat tree network (e.g., as shown in FIG. 3T). A flat fly network topology 300U may be formed by linking a plurality of GPUs in a torus-like configuration with GPUs being additionally connected with GPUs two hops away in a pattern known as a flat fly network (e.g., as shown in FIG. 3U). A slim fly network topology 300V may be formed by linking a plurality of GPUs with multiple sets of fully connected GPUs with each GPU in each set being additionally connected with GPUs in two or more other sets in a pattern known as a slim fly network (e.g., as shown in FIG. 3V). A dragonfly network topology 300W may be formed by linking a plurality of GPUs with multiple sets of fully connected GPUs with each GPU being additionally connected with a GPU in one other set in a pattern known as a dragon fly network (e.g., as shown in FIG. 3W).

The network topologies as shown in FIGS. 3C-3W are merely illustrative, and actual implementation may utilize expanded and/or hybrid topologies that span dozens, scores, hundreds, thousands, tens of thousands, hundreds of thou- sands, millions, tens of millions, hundreds of millions, billions, more GPUs or GPU devices that are pooled all together or pooled in sets or stages, each stage representing the same or different network topologies. In some examples, at least some GPUs or GPU devices at one or more stages may be multithreaded to perform multiple concurrent opera- tions or computations. In examples, the HPC system may be configured to control switching of the WSSs and OCSs either once before the series of computations is performed or dynamically during computation before computation at each of one or more stages has begun and/or after computation at each of one or more stages is completed.

In the manner above, by combining wavelength division multiplexing with selectively (and, in some cases, dynami- cally) controlled wide band OCSs and WSSs, massive or ultra scalability may be achieved with significantly lower number of hardware components needed to pool a large number of GPU for computation (e.g., hundreds of compo- nents such as OCSs plus WSSs, compared with thousands or tens of thousands of equivalent switches with conventional systems (and accompanying cables, connections, and acces- sories)). Further, due to the configurations of the OCSs and WSSs of the HPC, the plurality of OCSs and the plurality of WSSs can be selectively controlled to form multiple con- current and isolated network topologies. In some cases, each of the multiple concurrent and isolated network topologies may correspond to one of the network topologies 300C-300W in FIGS. 3C-3W, and each may be formed from one or more pools of similar numbers or different numbers of GPUs or GPU devices compared with other concurrent network topologies within the HPC. For example, a million GPUs may be arranged in a flat fly network topology that is configured to be operational concurrent with ten thousand GPUs arranged in a butterfly network topology, both being configured to be operational concurrent with half a million GPUs arranged in a Clos/Benes network topology, and so on.

In an example, for an 8×26 WSS, 13312 wavelength radix switches can be created using the 208 port WSS at 64 wavelengths. These ports may be connected to an OCS that switches at a port base (e.g., switching a full spectrum of data off ports) and switching full data rates at each OCS (e.g., a 600×600 OCS). For 64 channels at 1.6 Tbps per channel, 102.4 Tbps per port switching rate may be achieved for global interconnect. As described herein, every GPU of the HPC system can connect to every other GPU, so the core switches full DWDM spectra and the WSSs can switch at a wavelength granularity (e.g., due to use of contentionless WSSs that switches all supported wavelengths to any device). For WSSs in which half of its ports (e.g., half of 208 ports, that is, 104 ports) connect to 104 OCSs that have 600 connections each, almost 4 million GPUs may be connected together (e.g., 104 OCSs with 600 ports each for 64 wave- lengths).

In another example, for GPU devices using 1.6 Tbps optoelectronic devices or optics with 80 channels, and for a million GPUs, performance enhancement may be achieved, providing for up to 8 Tbps bandwidth per GPU, significantly improving data transfer rates. Optimal resource utilization may also be achieved due to minimal WSS usage per pod or pool of GPUs (e.g., 0.03) and with balanced use of OCSs (e.g., 20) and WSS (e.g., 120). With a WSS effective radix of 33,000 and OCS full-spectrum operation, the HPC system scales efficiently, supporting up to 5 million GPUs, or more with addition of several more OCSs and WSSs. Network flexibility is achievable due to the design and configuration of the HPC system allowing for any desired direct connect topology, adapting to varying network requirements. Fur- ther, because the HPC system is designed for continued scaling with increased switch radix and frequencies, its longevity in fast-evolving technological environments is ensured.

FIGS. 4A-4C depict various example methods 400A-400C for implementing AI clusters using ultra-scalable HPC network or system based on DWDM. FIG. 4A is directed to method 400A for implementing training or inferencing for AI clusters using the ultra-scalable HPC network or system, while FIG. 4B is directed to training a neural network, and FIG. 4C is directed to training an LLM.

With reference to the non-limiting example method 400A of FIG. 4A, at operation 405, a computing system receives first input indicating a first network topology among a plurality of network topologies to connect a plurality of GPU devices of an HPC system (e.g., HPC system(s) 105 of FIGS. 1, 2A, 3A, and/or 3B). In examples, the plurality of network topologies includes the various example network topologies 300C-300W as described above with respect to FIGS. 3C-3W. In some examples, the HPC system includes a plurality of GPU mux/demux devices, a plurality of amplifiers, a plurality of WSSs, and a plurality of OCSs. In some instances, the HPC system further includes the com- puting system. Each GPU device includes one or more GPUs and an optoelectronic device, at least one GPU device among the plurality of GPU devices further including one or more GPU I/O ports. Each GPU mux/demux device is communicatively coupled with a first number of optoelec- tronic devices of a corresponding first number of GPU devices. Each OCS includes a second number of I/O ports and a third number of MEMS mirrors, each MEMS mirror being configured to selectively route optical signals between one I/O port and another I/O port among the second number of I/O ports. Each WSS includes a plurality of WSS mux/demux devices, a fourth number of WSS mux/demux devices each being communicatively coupled with a GPU mux/demux device among the plurality of GPU mux/demux devices and a fifth number of WSS mux/demux devices each being communicatively coupled with an I/O port among the second number of I/O ports of an OCS among the plurality of OCSs. Each WSS mux/demux device is configured to communicatively couple with each of two or more other WSS mux/demux devices among the plurality of mux/demux device. Each WSS is configured to selectively route optical signals between two of the WSS mux/demux devices.

At operation 410, the computing system controls the plurality of WSSs and the plurality of OCSs to selectively route optical signals between the two of the WSS mux/demux devices of one or more WSSs and to selectively route optical signals between I/O ports of one or more OCSs to connect a sixth number of GPU devices in the first network topology for computing a series of computations. At operation 415, the computing system receives, via at least one GPU I/O port among the one or more GPU I/O ports, second input including at least one of input data or input prompts. In response to receiving the second input, the computing system performs the series of computations over the first network topology using the at least one of input data or input prompts (at operation 420), and outputs, via the at least one GPU I/O port, results of the series of computations (at operation 425). In examples, first and second inputs may be received from a user device (e.g., a user device among the user devices 165a-165s of FIG. 1) over a network(s) (e.g., network(s) 155a and/or 155b of FIG. 1), and the results of the series of computations may be sent back to the user device over the network(s).

Turning to the non-limiting example method 400B of FIG. 4B, training of a neural network represented by solving the series of computations over the first network topology may be implemented, at operation 430. In some embodiments, training (at operation 430) may be implemented by performing the series of computations in a forward direction through the sixth number of GPU devices in the first network topology (at operation 435); performing one or more error calculations on results of the series of computations (at operation 440); and performing digital back propagation in a reverse direction through the sixth number of GPU devices in the first network topology to adjust weights in the series of computations based on the one or more error calculations (at operation 445). The processes at operations 435-445 may be repeated until at least one of a number of iterations (e.g., a number within a range of 1-10, 1-100, or 1-1000) has been reached or error results have fallen below a threshold amount (e.g., a percentage or proportion of match with ground-truth results within a range of 1-5%, 1-10%, 1-15%, 1-20%, 1-25%, or 1-50%).

Referring to the non-limiting example method 400C of FIG. 4C, training of an LLM represented by solving the series of computations over the first network topology may be implemented, at operation 450. In some embodiments, training (at operation 450) may be implemented by performing the series of computations in a forward direction through the sixth number of GPU devices in the first network topology to compute a probability of one or more candidate next words given previous words contained within the at least one of input data or input prompts (at operation 455); and generating the one or more next words based on the computed probability of each of the one or more candidate next words (at operation 460). Training (at operation 450) may be further implemented by performing one or more error calculations by either comparing the computed probability with ground truth probability data or comparing the generated one or more next words with ground truth next words (at operation 465); and performing digital back propagation in a reverse direction through the sixth number of GPU devices in the first network topology to adjust weights in the series of computations based on the one or more error calculations (at operation 470). The processes at operations 455-470 may be repeated until at least one of a number of iterations has been reached or error results have fallen below a threshold amount. In examples, the threshold amount comprising one of a probability difference threshold value (e.g., a value within a range of 1-5%, 1-10%, 1-15%, 1-20%, 1-25%, or 1-50%) or a percentage correct match threshold value (e.g., a value within a range of 1-5%, 1-10%, 1-15%, 1-20%, 1-25%, or 1-50%).

While the techniques and procedures in methods 400A-400C are depicted and/or described in a certain order for purposes of illustration, it should be appreciated that certain procedures may be reordered and/or omitted within the scope of various embodiments. Moreover, while the methods 400A-400C may be implemented by or with (and, in some cases, are described below with respect to) the systems, examples, or embodiments 100, 200A-200H, and 300A-300W of FIGS. 1, 2A-2H, and 3A-3W, respectively (or components thereof), such methods may also be implemented using any suitable hardware (or software) implementation. Similarly, while each of the systems, examples, or embodiments 100, 200A-200H, and 300A-300W of FIGS. 1, 2A-2H, and 3A-3W, respectively (or components thereof), can operate according to the methods 400A-400C (e.g., by executing instructions embodied on a computer readable medium), the systems, examples, or embodiments 100, 200A-200H, and 300A-300W of FIGS. 1, 2A-2H, and 3A-3W can each also operate according to other modes of operation and/or perform other suitable procedures.

Figure 5:
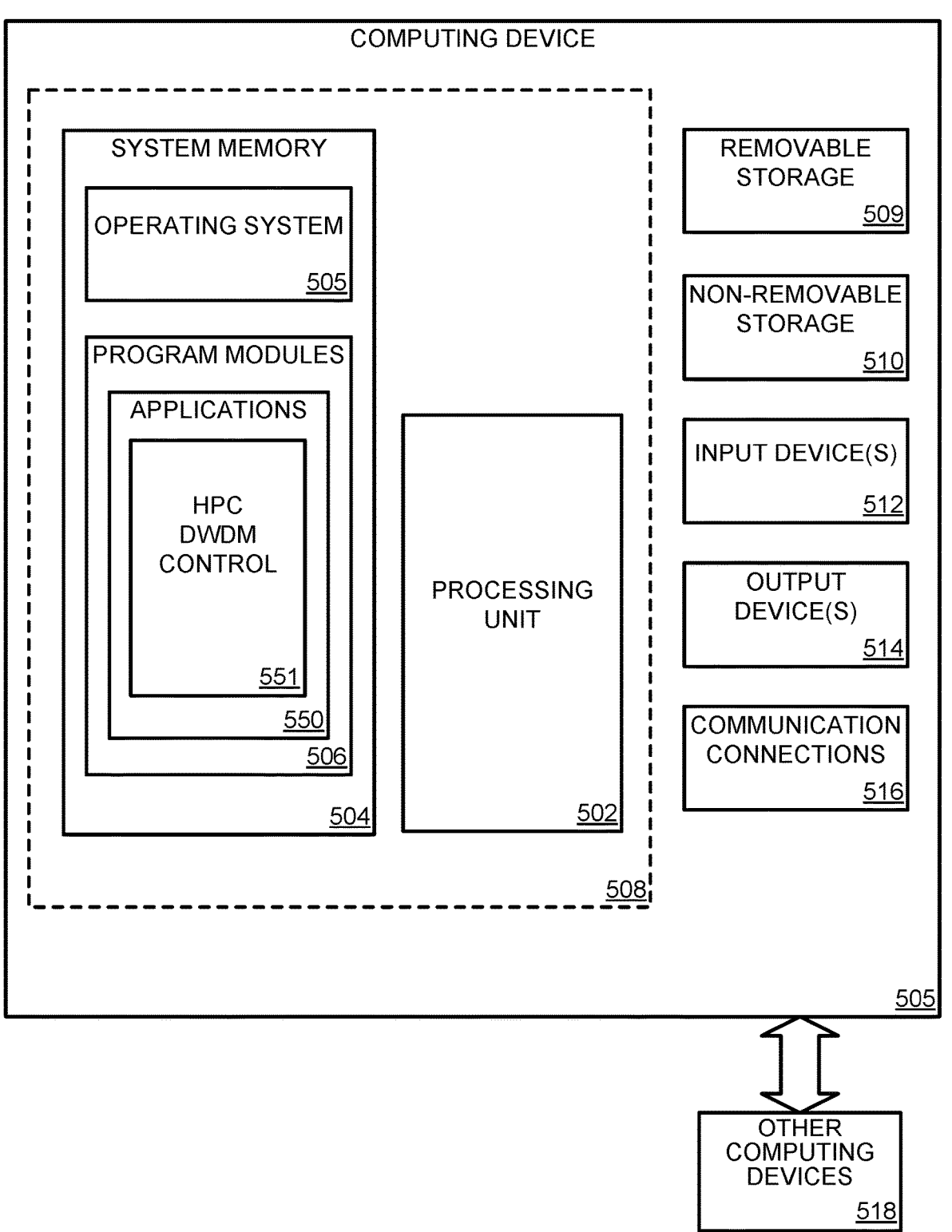
FIG. 5 depict a block diagram illustrating example physical components of a computing device with which aspects of the technology may be practiced.

FIG. 5 depicts a block diagram illustrating physical components (i.e., hardware) of a computing device 500 with which examples of the present disclosure may be practiced. The computing device components described below may be suitable for a client device implementing the AI clusters using ultra-scalable HPC network based on DWDM, as discussed above. In a basic configuration, the computing device 500 may include at least one processing unit 502 and a system memory 504. The processing unit(s) (e.g., processors) may be referred to as a processing system. Depending on the configuration and type of computing device, the system memory 504 may include volatile storage (e.g., random access memory), non-volatile storage (e.g., read-only memory), flash memory, or any combination of such memories. The system memory 504 may include an operating system 505 and one or more program modules 506 suitable for running software applications 550, such as HPC DWDM control 551, to implement one or more of the systems or methods described above.

The operating system 505, for example, may be suitable for controlling the operation of the computing device 500. Furthermore, aspects of the invention may be practiced in conjunction with a graphics library, other operating systems, or any other application program and is not limited to any particular application or system. This basic configuration is illustrated in FIG. 5 by those components within a dashed line 508. The computing device 500 may have additional features or functionalities. For example, the computing device 500 may also include additional data storage devices (which may be removable and/or non-removable), such as, for example, magnetic disks, optical disks, or tape. Such additional storage is illustrated in FIG. 5 by a removable storage device(s) 509 and a non-removable storage device(s) 510.

As stated above, a number of program modules and data files may be stored in the system memory 504. While executing on the processing unit 502, the program modules

506 may perform processes including one or more of the operations of the method(s) as illustrated in FIGS. 4A-4C, or one or more operations of the system(s) and/or apparatus(es) as described with respect to FIGS. 1-3W, or the like. Other program modules that may be used in accordance with examples of the present disclosure may include applications such as electronic mail and contacts applications, word processing applications, spreadsheet applications, database applications, slide presentation applications, drawing or computer-aided application programs, artificial intelligence ("AI") applications and machine learning ("ML") modules on cloud-based systems, etc.

Furthermore, examples of the present disclosure may be practiced in an electrical circuit including discrete electronic elements, packaged or integrated electronic chips containing logic gates, a circuit utilizing a microprocessor, or on a single chip containing electronic elements or microprocessors. For example, examples of the present disclosure may be practiced via a system-on-a-chip ("SOC") where each or many of the components illustrated in FIG. 5 may be integrated onto a single integrated circuit. Such an SOC device may include one or more processing units, graphics units, communications units, system virtualization units and various application functionalities all of which may be integrated (or "burned") onto the chip substrate as a single integrated circuit. When operating via an SOC, the functionality, described herein, with respect to generating suggested queries, may be operated via application-specific logic integrated with other components of the computing device 500 on the single integrated circuit (or chip). Examples of the present disclosure may also be practiced using other technologies capable of performing logical operations such as, for example, AND, OR, and NOT, including, but not limited to, mechanical, optical, fluidic, and/or quantum technologies.

The computing device 500 may also have one or more input devices 512 such as a keyboard, a mouse, a pen, a sound input device, and/or a touch input device, etc. The output device(s) 514 such as a display, speakers, and/or a printer, etc. may also be included. The aforementioned devices are examples and others may be used. The computing device 500 may include one or more communication connections 516 allowing communications with other computing devices 518. Examples of suitable communication connections 516 include, but are not limited to, radio frequency ("RF") transmitter, receiver, and/or transceiver circuitry; universal serial bus ("USB"), parallel, and/or serial ports; and/or the like.

The term "computer readable media" as used herein may include computer storage media. Computer storage media may include volatile and nonvolatile, and/or removable and non-removable, media that may be implemented in any method or technology for storage of information, such as computer readable instructions, data structures, or program modules. The system memory 504, the removable storage device 509, and the non-removable storage device 510 are all computer storage media examples (i.e., memory storage). Computer storage media may include random access memory ("RAM"), read-only memory ("ROM"), electrically erasable programmable read-only memory ("EE-PROM"), flash memory or other memory technology, compact disk read-only memory ("CD-ROM"), digital versatile disks ("DVD") or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media may be non-transitory and tangible, and computer storage media do not include a carrier wave or other propagated data signal.

Communication media may be embodied by computer readable instructions, data structures, program modules, or other data in a modulated data signal, such as a carrier wave or other transport mechanism, and may include any information delivery media. The term "modulated data signal" may describe a signal that has one or more characteristics that are set or changed in such a manner as to encode information in the signal. By way of example, and not limitation, communication media may include wired media such as a wired network or direct-wired connection, and wireless media such as acoustic, RF, infrared, and other wireless media.

As should be appreciated from the foregoing, the present technology provides multiple technical benefits and solutions to technical problems. For instance, assembling networks for training AI systems and/or for use of AI systems for inferencing generally raises multiple technical problems. For instance, one technical problem includes that such networks require significant numbers of components (e.g., hundreds of thousands to millions of optical components, thousands to tens of thousands of optical switches, and millions to tens of millions of cables) for connecting a number of GPUs together, which results in significant equipment costs. Another technical problem includes putting these significant numbers of components together into the assembled network, which results in costs in terms of time and labor costs, in addition to issues with testing and maintaining such a large assembly of components. The present technology provides for a HPC network or system as shown and described above with respect to FIGS. 1-3B. In the configuration of the HPC, such as described above for instance, a much smaller number of components is required for connecting an equivalent number of GPUs together (e.g., cables (e.g., tens of OCSs, over a hundred WSSs, and less than a half million cables), while providing over an order of magnitude greater bandwidth compared with the best of the conventional systems. The HPC system, according to the present technology, further enables ultra-scalability while maintaining the relatively lower number of components. Other benefits include lower equipment costs, lower time costs, lower labor costs, simpler assembly, and fewer potential maintenance issues.

In an aspect, the technology relates to an HPC system, including: a plurality of GPU devices, each GPU device including one or more GPUs and an optoelectronic device configured to convert and output data signals from the one or more GPUs into optical output signals and configured to convert optical input signals into data signals to be input into the one or more GPUs. The HPC system further includes a plurality of GPU mux/demux devices, each GPU mux/demux device being communicatively coupled with a first number of optoelectronic devices of a corresponding first number of GPU devices; and a plurality of OCSs, each OCS including a second number of I/O ports and a third number of MEMS mirrors, each MEMS mirror being configured to selectively route optical signals between one I/O port and another I/O port among the second number of I/O ports. The HPC system further includes a plurality of WSSs, each WSS including a first set of WSS mux/demux devices and a second set of WSS mux/demux devices. The first set of WSS mux/demux devices includes a fourth number of WSS mux/demux devices each being communicatively coupled with a GPU mux/demux device among the plurality of GPU mux/demux devices. The second set of WSS mux/demux devices includes a fifth number of WSS mux/demux devices each being communicatively coupled with an I/O port among the second number of I/O ports of an OCS among the plurality of OCSs. Each WSS is configured to selectively route optical signals between one of the first set of WSS mux/demux devices and one of the second set of WSS mux/demux devices. Selectively routing optical signals between the first set of WSS mux/demux devices and the second set of WSS mux/demux devices of one or more WSSs and selectively routing optical signals between I/O ports of one or more OCSs results in connecting a sixth number of GPU devices in a first network topology among a plurality of network topologies for computing a series of computations.

In examples, the HPC system further includes a plurality of amplifiers, each amplifier being configured to amplify an optical signal between a GPU mux/demux device among the plurality of GPU mux/demux devices and a WSS among the plurality of WSSs. In some cases, the plurality of GPU devices is distributed across a plurality of GPU servers, the plurality of GPU servers including a seventh number of GPU servers, each GPU server including two or more GPU devices that are communicatively coupled to each other via one or more connectors of said GPU server. In some instances, the plurality of GPU servers includes two or more GPU servers having different numbers of GPU devices that are communicatively coupled to each other within respective GPU servers. In some examples, one or more of at least one GPU server among the plurality of GPU servers or at least one GPU device among the plurality of GPU devices further includes one or more GPU I/O ports each configured to receive at least one of input data or input prompts that are used for computing the series of computations over the first network topology and configured to output results from the series of computations. In examples, an eighth number of GPUs contained among the sixth number of GPU devices are pooled together as at least one multiprocessor via the first network topology to collectively compute the series of computations. In some cases, one or more sets of GPUs among the eighth number of pooled GPUs are each multi-threaded to perform parallel computations.

In some examples, at least one GPU device among the plurality of GPU devices each includes two or more GPUs, each of the two or more GPUs communicatively coupling with at least one other GPU and with the optoelectronic device using a serdes, each serdes being configured to convert between parallel data signals and serial data signals. In some cases, the optoelectronic device is further configured to convert between data signals and optical signals, the data signals including the data signals that are output from the one or more GPUs and the data signals that are input into the one or more GPUs, the optical signals including the optical output signals and the optical input signals.

In examples, each optoelectronic device includes at least one of an optical signal transducer, an electrical-to-optical transducer, or an optical-to-electrical transducer. In some cases, each WSS mux/demux device of at least one WSS among the plurality of WSSs is further configured to communicatively couple with each other WSS mux/demux device within the at least one WSS, wherein each of the at least one WSS is further configured to selectively route optical signals between two of the WSS mux/demux devices within the at least one WSS.

In some examples, the plurality of network topologies includes at least one of a point-to-point network topology, a linear network topology, a bus network topology, a ring network topology, a star network topology, a tree network topology, a mesh network topology, a fully connected network topology, a daisy-chain network topology, or a hybrid network topology, wherein the hybrid network topology includes at least one of a torus network topology, a spiral network topology, a butterfly network topology, a hypercube network topology, a Clos/Benes network topology, a Kautz network topology, a fat tree network topology, a flat fly network topology, a slim fly network topology, a dragonfly network topology, a random network topology, or other network topology that combines two or more other network topologies among the plurality of network topologies.

In examples, a computing system is used to control the plurality of OCSs and the plurality of WSSs to selectively route the optical signals between the first set of WSS mux/demux devices and the second set of WSS mux/demux devices of one or more WSSs and to selectively route the optical signals between I/O ports of one or more OCSs to connect the sixth number of GPU devices in the first network topology for computing the series of computations.

In another aspect, the technology relates to a system, including an HPC system and a computing system. The HPC system includes a plurality of GPU devices, each GPU device including one or more GPUs and an optoelectronic device; a plurality of GPU mux/demux devices, each GPU mux/demux device being communicatively coupled with a first number of optoelectronic devices of a corresponding first number of GPU devices; and a plurality of OCSs, each OCS including a second number of I/O ports and a third number of MEMS mirrors, each MEMS mirror being configured to selectively route optical signals between one I/O port and another I/O port among the second number of I/O ports. The HPC system further includes a plurality of WSSs, each WSS including a plurality of WSS mux/demux devices, a fourth number of WSS mux/demux devices each being communicatively coupled with a GPU mux/demux device among the plurality of GPU mux/demux devices and a fifth number of WSS mux/demux devices each being communicatively coupled with an I/O port among the second number of I/O ports of an OCS among the plurality of OCSs. Each WSS mux/demux device is configured to communicatively couple with each of two or more other WSS mux/demux devices among the plurality of mux/demux device, wherein each WSS is configured to selectively route optical signals between two of the WSS mux/demux devices. The HPC system further includes a plurality of amplifiers, each amplifier being configured to amplify an optical signal between a GPU mux/demux device among the plurality of GPU mux/demux devices and a WSS among the plurality of WSSs. The computing system is configured to control the plurality of OCSs and the plurality of WSSs to selectively route optical signals between two of the WSS mux/demux devices of one or more WSSs and to selectively route optical signals between I/O ports of one or more OCSs to connect a sixth number of GPU devices in a first network topology among a plurality of network topologies for computing a series of computations.

In some examples, the computing system includes at least one of an orchestrator, an HPC controller, a server, an AI system, a cloud computing system, or a distributed computing system. In some cases, the plurality of GPU devices is distributed across a plurality of GPU servers, the plurality of GPU servers including a seventh number of GPU servers, wherein the plurality of GPU servers includes two or more GPU servers having different numbers of GPU devices that are communicatively coupled to each other within respective GPU servers. In some instances, one or more of at least one GPU server among the plurality of GPU servers or at least one GPU device among the plurality of GPU devices further includes one or more GPU I/O ports. The system further includes an I/O interface system the communicatively couples with the one or more GPU I/O ports, each GPU I/O port being configured to receive, via the I/O interface system, at least one of input data or input prompts that are used for computing the series of computations over the first network topology and configured to output, via the I/O interface system, results from the series of computations. In examples, an eighth number of GPUs contained among the sixth number of GPU devices are pooled together as at least one multiprocessor via the first network topology to collectively compute the series of computations.

In yet another aspect, the technology relates to a computer-implemented method, including receiving first input indicating a first network topology among a plurality of network topologies to connect a plurality of GPU devices of an HPC system, each GPU device including one or more GPUs and an optoelectronic device, at least one GPU device among the plurality of GPU devices further including one or more GPU I/O ports. The HPC system includes a plurality of GPU mux/demux devices, each GPU mux/demux device being communicatively coupled with a first number of optoelectronic devices of a corresponding first number of GPU devices; and a plurality of OCSs, each OCS including a second number of I/O ports and a third number of MEMS mirrors, each MEMS mirror being configured to selectively route optical signals between one I/O port and another I/O port among the second number of I/O ports. The HPC system further includes a plurality of WSSs, each WSS including a plurality of WSS mux/demux devices, a fourth number of WSS mux/demux devices each being communicatively coupled with a GPU mux/demux device among the plurality of GPU mux/demux devices and a fifth number of WSS mux/demux devices each being communicatively coupled with an I/O port among the second number of I/O ports of an OCS among the plurality of OCSs. Each WSS mux/demux device is configured to communicatively couple with each of two or more other WSS mux/demux devices among the plurality of mux/demux device, wherein each WSS is configured to selectively route optical signals between two of the WSS mux/demux devices. The method further includes controlling the plurality of WSSs and the plurality of OCSs to selectively route optical signals between the two of the WSS mux/demux devices of one or more WSSs and to selectively route optical signals between I/O ports of one or more OCSs to connect a sixth number of GPU devices in the first network topology for computing a series of computations. The method further includes, in response to receiving, via at least one GPU I/O port among the one or more GPU I/O ports, second input including at least one of input data or input prompts, performing the series of computations over the first network topology using the at least one of input data or input prompts; and outputting, via the at least one GPU I/O port, results of the series of computations.

The method further includes implementing training of a neural network represented by solving the series of computations over the first network topology, by: performing the series of computations in a forward direction through the sixth number of GPU devices in the first network topology; performing one or more error calculations on results of the series of computations; performing digital back propagation in a reverse direction through the sixth number of GPU devices in the first network topology to adjust weights in the series of computations based on the one or more error calculations; and repeating these processes until at least one of a number of iterations has been reached or error results have fallen below a threshold amount.

The method further includes implementing training of an LLM represented by solving the series of computations over the first network topology, by: performing the series of computations in a forward direction through the sixth number of GPU devices in the first network topology to compute a probability of one or more candidate next words given previous words contained within the at least one of input data or input prompts; generating the one or more next words based on the computed probability of each of the one or more candidate next words; performing one or more error calculations by either comparing the computed probability with ground truth probability data or comparing the generated one or more next words with ground truth next words; performing digital back propagation in a reverse direction through the sixth number of GPU devices in the first network topology to adjust weights in the series of computations based on the one or more error calculations; and repeating these processes until at least one of a number of iterations has been reached or error results have fallen below a threshold amount, the threshold amount including one of a probability difference threshold value or a percentage correct match threshold value.

In this detailed description, wherever possible, the same reference numbers are used in the drawing and the detailed description to refer to the same or similar elements. In some instances, a sub-label is associated with a reference numeral to denote one of multiple similar components. When reference is made to a reference numeral without specification to an existing sub-label, it is intended to refer to all such multiple similar components. For denoting a plurality of components, the suffixes "a" through "n" may be used, where n denotes any suitable integer number (unless it denotes the number 14, if there are components with reference numerals having suffixes "a" through "m" preceding the component with the reference numeral having a suffix "n"), and may be either the same or different from the suffix "n" for other components in the same or different figures. For example, for component #1 X05a-X05n, the integer value of n in X05n may be the same or different from the integer value of n in X10n for component #2 X10a-X10n, and so on.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components including one unit and elements and components that include more than one unit, unless specifically stated otherwise.

In this detailed description, for the purposes of explanation, numerous specific details are set forth to provide a thorough understanding of the described embodiments. It will be apparent to one skilled in the art, however, that other embodiments of the present invention may be practiced without some of these specific details. In other instances, certain structures and devices are shown in block diagram form. While aspects of the technology may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the detailed description does not limit the technology, but instead, the proper scope of the technology is defined by the appended claims. Examples may take the form of a hardware implementation, or an entirely software implementation, or an implementation combining software and hardware aspects. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features. The detailed description is, therefore, not to be taken in a limiting sense.

Aspects of the present invention, for example, are described above with reference to block diagrams and/or operational illustrations of methods, systems, and computer program products according to aspects of the invention. The functions and/or acts noted in the blocks may occur out of the order as shown in any flowchart. For example, two blocks shown in succession may in fact be executed substantially concurrently or the blocks may sometimes be executed in the reverse order, depending upon the functionalities and/or acts involved. Further, as used herein and in the claims, the phrase "at least one of element A, element B, or element C" (or any suitable number of elements) is intended to convey any of: element A, element B, element C, elements A and B, elements A and C, elements B and C, and/or elements A, B, and C (and so on).

The description and illustration of one or more aspects provided in this application are not intended to limit or restrict the scope of the invention as claimed in any way. The aspects, examples, and details provided in this application are considered sufficient to convey possession and enable others to make and use the best mode of the claimed invention. The claimed invention should not be construed as being limited to any aspect, example, or detail provided in this application. Regardless of whether shown and described in combination or separately, the various features (both structural and methodological) are intended to be selectively rearranged, included, or omitted to produce an example or embodiment with a particular set of features. Having been provided with the description and illustration of the present application, one skilled in the art may envision variations, modifications, and alternate aspects, examples, and/or similar embodiments falling within the spirit of the broader aspects of the general inventive concept embodied in this application that do not depart from the broader scope of the claimed invention.

What is claimed is:

1. A system, comprising:

a plurality of graphics processing unit ("GPU") devices, each GPU device comprising one or more GPUs and an optoelectronic device configured to convert and output data signals from the one or more GPUs into optical output signals and configured to convert optical input signals into data signals to be input into the one or more GPUs;

a plurality of GPU multiplexer/demultiplexer ("mux/demux") devices, each GPU mux/demux device being communicatively coupled with a first number of optoelectronic devices of a corresponding first number of GPU devices;

a plurality of optical circuit switches ("OCSs"), each OCS comprising a second number of input/output ("I/O") ports and a third number of micro-electromechanical systems ("MEMS") mirrors, each MEMS mirror being configured to selectively route optical signals between one I/O port and another I/O port among the second number of I/O ports;

a plurality of wavelength selective switches ("WSSs"), each WSS comprising a first set of WSS mux/demux devices and a second set of WSS mux/demux devices, the first set of WSS mux/demux devices comprising a fourth number of WSS mux/demux devices each being communicatively coupled with a GPU mux/demux device among the plurality of GPU mux/demux devices, the second set of WSS mux/demux devices comprising a fifth number of WSS mux/demux devices each being communicatively coupled with an I/O port among the second number of I/O ports of an OCS among the plurality of OCSs, wherein each WSS is configured to selectively route optical signals between one of the first set of WSS mux/demux devices and one of the second set of WSS mux/demux devices;

wherein selectively routing optical signals between the first set of WSS mux/demux devices and the second set of WSS mux/demux devices of one or more WSSs and selectively routing optical signals between I/O ports of one or more OCSs results in connecting a sixth number of GPU devices in a first network topology among a plurality of network topologies for computing a series of computations.

2. The system of claim 1, further comprising:

a plurality of amplifiers, each amplifier being configured to amplify an optical signal between a GPU mux/demux device among the plurality of GPU mux/demux devices and a WSS among the plurality of WSSs.

3. The system of claim 1, wherein the plurality of GPU devices is distributed across a plurality of GPU servers, the plurality of GPU servers comprising a seventh number of GPU servers, each GPU server comprising two or more GPU devices that are communicatively coupled to each other via one or more connectors of said GPU server.

4. The system of claim 3, wherein the plurality of GPU servers comprises two or more GPU servers having different numbers of GPU devices that are communicatively coupled to each other within respective GPU servers.

5. The system of claim 3, wherein one or more of at least one GPU server among the plurality of GPU servers or at least one GPU device among the plurality of GPU devices further comprises one or more GPU I/O ports each configured to receive at least one of input data or input prompts that are used for computing the series of computations over the first network topology and configured to output results from the series of computations.

6. The system of claim 3, wherein an eighth number of GPUs contained among the sixth number of GPU devices are pooled together as at least one multiprocessor via the first network topology to collectively compute the series of computations.

7. The system of claim 6, wherein one or more sets of GPUs among the eighth number of pooled GPUs are each multi-threaded to perform parallel computations.

8. The system of claim 1, wherein at least one GPU device among the plurality of GPU devices each comprises two or more GPUs, each of the two or more GPUs communicatively coupling with at least one other GPU and with the optoelectronic device using a serializer/deserializer ("serdes"), each serdes being configured to convert between parallel data signals and serial data signals, the optoelectronic device being further configured to convert between data signals and optical signals, the data signals comprising the data signals that are output from the one or more GPUs and the data signals that are input into the one or more GPUs, the optical signals comprising the optical output signals and the optical input signals.

9. The system of claim 1, wherein each optoelectronic device comprises at least one of an optical signal transducer, an electrical-to-optical transducer, or an optical-to-electrical transducer.

10. The system of claim 1, wherein each WSS mux/demux device of at least one WSS among the plurality of WSSs is further configured to communicatively couple with each other WSS mux/demux device within the at least one WSS, wherein each of the at least one WSS is further configured to selectively route optical signals between two of the WSS mux/demux devices within the at least one WSS.

11. The system of claim 1, wherein the plurality of network topologies comprises at least one of a point-to-point network topology, a linear network topology, a bus network topology, a ring network topology, a star network topology, a tree network topology, a mesh network topology, a fully connected network topology, a daisy-chain network topology, or a hybrid network topology, wherein the hybrid network topology comprises at least one of a torus network topology, a spiral network topology, a butterfly network topology, a hypercube network topology, a Clos/Benes network topology, a Kautz network topology, a fat tree network topology, a flat fly network topology, a slim fly network topology, a dragonfly network topology, a random network topology, or other network topology that combines two or more other network topologies among the plurality of network topologies.

12. The system of claim 1, wherein a computing system is used to control the plurality of OCSs and the plurality of WSSs to selectively route the optical signals between the first set of WSS mux/demux devices and the second set of WSS mux/demux devices of one or more WSSs and to selectively route the optical signals between I/O ports of one or more OCSs to connect the sixth number of GPU devices in the first network topology for computing the series of computations.

13. A system, comprising:

a first computing system, comprising:

a plurality of graphics processing unit ("GPU") devices, each GPU device comprising one or more GPUs and an optoelectronic device;

a plurality of GPU multiplexer/demultiplexer ("mux/demux") devices, each GPU mux/demux device being communicatively coupled with a first number of optoelectronic devices of a corresponding first number of GPU devices;

a plurality of optical circuit switches ("OCSs"), each OCS comprising a second number of input/output ("I/O") ports and a third number of micro-electro-mechanical systems ("MEMS") mirrors, each MEMS mirror being configured to selectively route optical signals between one I/O port and another I/O port among the second number of I/O ports;

a plurality of wavelength selective switches ("WSSs"), each WSS comprising a plurality of WSS mux/demux devices, a fourth number of WSS mux/demux devices each being communicatively coupled with a GPU mux/demux device among the plurality of GPU mux/demux devices and a fifth number of WSS mux/demux devices each being communicatively coupled with an I/O port among the second number of I/O ports of an OCS among the plurality of OCSs, each WSS mux/demux device being configured to communicatively couple with each of two or more other WSS mux/demux devices among the plurality of mux/demux device, wherein each WSS is configured to selectively route optical signals between two of the WSS mux/demux devices;

a plurality of amplifiers, each amplifier being configured to amplify an optical signal between a GPU mux/demux device among the plurality of GPU mux/demux devices and a WSS among the plurality of WSSs; and a second computing system configured to control the plurality of OCSs and the plurality of WSSs to selectively route optical signals between two of the WSS mux/demux devices of one or more WSSs and to selectively route optical signals between I/O ports of one or more OCSs to connect a sixth number of GPU devices in a first network topology among a plurality of network topologies for computing a series of computations.

14. The system of claim 13, wherein the second computing system comprises at least one of an orchestrator, a controller, a server, an artificial intelligence ("AI") system, a cloud computing system, or a distributed computing system.

15. The system of claim 13, wherein the plurality of GPU devices is distributed across a plurality of GPU servers, the plurality of GPU servers comprising a seventh number of GPU servers, wherein the plurality of GPU servers comprises two or more GPU servers having different numbers of GPU devices that are communicatively coupled to each other within respective GPU servers.

16. The system of claim 15, wherein one or more of at least one GPU server among the plurality of GPU servers or at least one GPU device among the plurality of GPU devices further comprises one or more GPU I/O ports, the system further comprising:

an I/O interface system the communicatively couples with the one or more GPU I/O ports, each GPU I/O port being configured to receive, via the I/O interface system, at least one of input data or input prompts that are used for computing the series of computations over the first network topology and configured to output, via the I/O interface system, results from the series of computations.

17. The system of claim 13, wherein an eighth number of GPUs contained among the sixth number of GPU devices are pooled together as at least one multiprocessor via the first network topology to collectively compute the series of computations.

18. A computer-implemented method, comprising:

receiving first input indicating a first network topology among a plurality of network topologies to connect a plurality of graphics processing unit ("GPU") devices of a system, each GPU device comprising one or more GPUs and an optoelectronic device, at least one GPU device among the plurality of GPU devices further comprising one or more GPU I/O ports, the system further comprising:

a plurality of GPU multiplexer/demultiplexer ("mux/demux") devices, each GPU mux/demux device being communicatively coupled with a first number of optoelectronic devices of a corresponding first number of GPU devices;

a plurality of optical circuit switches ("OCSs"), each OCS comprising a second number of input/output ("I/O") ports and a third number of micro-electro-mechanical systems ("MEMS") mirrors, each MEMS mirror being configured to selectively route optical signals between one I/O port and another I/O port among the second number of I/O ports; and a plurality of wavelength selective switches ("WSSs"), each WSS comprising a plurality of WSS mux/demux devices, a fourth number of WSS mux/demux devices each being communicatively coupled with a GPU mux/demux device among the plurality of GPU mux/demux devices and a fifth number of WSS mux/demux devices each being communicatively coupled with an I/O port among the second number of I/O ports of an OCS among the plurality of OCSs, each WSS mux/demux device being configured to communicatively couple with each of two or more other WSS mux/demux devices among the plurality of mux/demux device, wherein each WSS is configured to selectively route optical signals between two of the WSS mux/demux devices;

controlling the plurality of WSSs and the plurality of OCSs to selectively route optical signals between the two of the WSS mux/demux devices of one or more WSSs and to selectively route optical signals between I/O ports of one or more OCSs to connect a sixth number of GPU devices in the first network topology for computing a series of computations;

in response to receiving, via at least one GPU I/O port among the one or more GPU I/O ports, second input comprising at least one of input data or input prompts, performing the series of computations over the first network topology using the at least one of input data or input prompts; and outputting, via the at least one GPU I/O port, results of the series of computations.

19. The computer-implemented method of claim 18, further comprising:

implementing training of a neural network represented by solving the series of computations over the first network topology, by:

performing the series of computations in a forward direction through the sixth number of GPU devices in the first network topology;

performing one or more error calculations on results of the series of computations;

performing digital back propagation in a reverse direction through the sixth number of GPU devices in the first network topology to adjust weights in the series of computations based on the one or more error calculations; and repeating these processes until at least one of a number of iterations has been reached or error results have fallen below a threshold amount.

20. The computer-implemented method of claim 18, further comprising:

implementing training of a language model represented by solving the series of computations over the first network topology, by:

performing the series of computations in a forward direction through the sixth number of GPU devices in the first network topology to compute a probability of one or more candidate next words given previous words contained within the at least one of input data or input prompts;

generating the one or more next words based on the computed probability of each of the one or more candidate next words;

performing one or more error calculations by either comparing the computed probability with ground truth probability data or comparing the generated one or more next words with ground truth next words;

performing digital back propagation in a reverse direction through the sixth number of GPU devices in the first network topology to adjust weights in the series of computations based on the one or more error calculations; and repeating these processes until at least one of a number of iterations has been reached or error results have fallen below a threshold amount, the threshold amount comprising one of a probability difference threshold value or a percentage correct match threshold value.

* * * * *